(12) United States Patent
Kim et al.

(10) Patent No.: US 10,691,402 B2
(45) Date of Patent: Jun. 23, 2020

(54) MULTIMEDIA DATA PROCESSING METHOD OF ELECTRONIC DEVICE AND ELECTRONIC DEVICE THEREOF

(71) Applicant: Samsung Electronics Co., Ltd., Gyeonggi-do (KR)

(72) Inventors: Hyun-Kyoung Kim, Seoul (KR); Wan-Je Park, Seoul (KR); Min-Sun Park, Seoul (KR)

(73) Assignee: Samsung Electronics Co., Ltd. (KR)

( * ) Notice: Subject to any disclaimer, the term of this patent is extended or adjusted under 35 U.S.C. 154(b) by 238 days.

(21) Appl. No.: 15/508,263

(22) PCT Filed: Sep. 2, 2015

(86) PCT No.: PCT/KR2015/009257
§ 371 (c)(1),
(2) Date: Mar. 2, 2017

(87) PCT Pub. No.: WO2016/036143
PCT Pub. Date: Mar. 10, 2016

(65) Prior Publication Data
US 2017/0286058 A1 Oct. 5, 2017

(30) Foreign Application Priority Data

Sep. 2, 2014 (KR) .......................... 10-2014-0116474

(51) Int. Cl.
*G06F 3/14* (2006.01)
*G06F 3/16* (2006.01)
(Continued)

(52) U.S. Cl.
CPC ............ *G06F 3/165* (2013.01); *G06F 3/0482* (2013.01); *G06F 3/0488* (2013.01);
(Continued)

(58) Field of Classification Search
CPC ..................................... G06F 3/14; G06F 3/17
(Continued)

(56) References Cited

U.S. PATENT DOCUMENTS 6,611,830 B2 * 8/2003 Shinoda ................ G06F 16/958
6,629,107 B1 * 9/2003 Ouchi ..................... G06F 16/48
(Continued)

FOREIGN PATENT DOCUMENTS

KR 1020110036462 4/2011
KR 1020130020065 2/2013
(Continued)

OTHER PUBLICATIONS

PCT/ISA/210 Search Report issued on PCT/KR2014/009257 (pp. 3).
(Continued)

*Primary Examiner* — Ruay Ho
(74) *Attorney, Agent, or Firm* — The Farrell Law Firm, P.C.

(57) ABSTRACT

Various examples of the present invention relate to a multimedia data processing method of an electronic device and an electronic device thereof, and the multimedia data processing method of an electronic device can comprise the steps of: acquiring information related to multimedia data from the electronic device when storing the multimedia data; linking the acquired information to the multimedia data and storing the same; and linking the stored information to the multimedia so as to output the same by audio, when the multimedia data is selected. In addition, various examples of the present invention include examples other than the above described example.

12 Claims, 18 Drawing Sheets

(51) Int. Cl.

| | |
|---|---|
| *G06F 16/432* | (2019.01) |
| *G06F 16/438* | (2019.01) |
| *G06F 17/00* | (2019.01) |
| *G06T 7/00* | (2017.01) |
| *G06F 16/583* | (2019.01) |
| *G06F 3/0481* | (2013.01) |
| *G06F 3/0482* | (2013.01) |
| *G06F 3/0484* | (2013.01) |
| *G06F 3/0488* | (2013.01) |
| *G06K 9/00* | (2006.01) |

(52) U.S. Cl.
CPC ...... *G06F 3/04817* (2013.01); *G06F 3/04842* (2013.01); *G06F 16/434* (2019.01); *G06F 16/438* (2019.01); *G06F 16/583* (2019.01); *G06F 17/00* (2013.01); *G06K 9/00288* (2013.01); *G06T 7/00* (2013.01)

(58) Field of Classification Search
USPC .......................... 715/255, 716; 382/118, 181
See application file for complete search history.

(56) References Cited

U.S. PATENT DOCUMENTS

| | | | |
|---|---|---|---|
| 2003/0048928 A1 | 3/2003 | Yavitz | |
| 2005/0223322 A1* | 10/2005 | Graham | G06F 3/1206 715/255 |
| 2009/0037477 A1 | 2/2009 | Choi et al. | |
| 2011/0066438 A1 | 3/2011 | Lindahl et al. | |
| 2011/0081952 A1 | 4/2011 | Song et al. | |
| 2012/0039513 A1* | 2/2012 | Kennedy | G06Q 30/02 382/118 |
| 2013/0039547 A1 | 2/2013 | Liu et al. | |
| 2013/0044921 A1 | 2/2013 | In et al. | |
| 2013/0129142 A1 | 5/2013 | Miranda-Steiner | |
| 2014/0114643 A1 | 4/2014 | Baker et al. | |
| 2014/0200894 A1 | 7/2014 | Osowski et al. | |
| 2014/0200895 A1 | 7/2014 | Stephens, Jr. | |

FOREIGN PATENT DOCUMENTS

| | | |
|---|---|---|
| KR | 1020140091554 | 7/2014 |
| KR | 101431651 | 8/2014 |

OTHER PUBLICATIONS

PCT/ISA/237 Written Opinion issued on PCT/KR2014/009257 (pp. 5).
Frode Eika Sandnes, "A Non-Visual Photo Collection Browser based on Automatically Generated Text Descriptions", Proceedings of 3rd International Conference on Software Development for Enhancing Accessibility and Fighting Info-Exclusion, Nov. 26, 2010, 5 pages.
European Search Report dated Mar. 8, 2018 issued in counterpart application No. 15838272.1-1217, 8 pages.
K.M. Kramer et al., "Smartphone Based Face Recognition Tool for the Blind", 32nd Annual International Conference of the IEEE EMBS, Aug. 31-Sep. 4, 2010, 4 pages.
Sreekar Krishna et al., A Systematic Requirements Analysis and Development of an Assistive Device to Enhance the Social Interaction of People Who are Blind or Visually Impaired, Workshop on Computer Vision Applications for the Visually Impaired, Sep. 29, 2008, 12 pages.
K. Susheel Kumar et al., Real Time Face Recognition Using AdaBoost Improved Fast PCA Algorithm, International Journal of Artificial Intelligence & Applications, Jul. 31, 2011, 14 pages.
European Search Report dated Apr. 12, 2019 issued in counterpart application No. 15838272.1-1217, 6 pages.
CSDN Article, "Intent Jumps to the Dialing Interface", https://blog.csdn.net/lilu_leo/article/details/6938729, Nov. 5, 2011, 12 pages.
Chinese Office Action dated Aug. 5, 2019 issued in counterpart application No. 201580047265.X, 23 pages.
EP Summons to Attend Oral Proceedings dated Dec. 17, 2019 issued in counterpart application No. 15838272.1-1217, 10 pages.
EP Result of Consultation dated Apr. 15, 2020 issued in counterpart application No. 15838272.1-1213, 13 pages.

* cited by examiner

MULTIMEDIA DATA PROCESSING METHOD OF ELECTRONIC DEVICE AND ELECTRONIC DEVICE THEREOF

PRIORITY

This application is a National Phase of PCT/KR2015/009257 filed Sep. 2, 2015, and claims priority to Korean Patent Application No. 10-2014-0116474, filed in the Korean Intellectual Property Office on Sep. 2, 2014, the contents of each of which are incorporated herein by reference.

TECHNICAL FIELD

The present invention relates to a method of processing multimedia data by an electronic device and an electronic device therefor.

BACKGROUND ART

Various types of electronic devices, such as a smart phone, a tablet PC, or the like, are widely utilized. For example, the electronic device, such as the smart phone or the like, may download various types of multimedia data such as still images including photos or pictures and dynamic images including movies, animation, and the like from the outside and store them, or photograph the various types of multimedia data through a camera and store them.

The electronic device may select the various types of multimedia data and display the multimedia data on a screen or transmit the multimedia data to the outside. The electronic device may display a list screen on which a user interface can be used in order to allow a user to conveniently use one of the various types of multimedia data.

For example, the electronic device may display a plurality of thumbnail pictures that represent each piece of the multimedia data on a list screen on which user selection can be performed, and the user may select a predetermined thumbnail picture from the plurality of thumbnail pictures displayed on the list screen, so as to conveniently select multimedia data which the user desires.

DETAILED DESCRIPTION OF THE INVENTION

Technical Problem

Various embodiments of the present invention provide a method of processing multimedia data by an electronic device and an electronic device therefor which, when multimedia data such as a still image or a dynamic image is selected in an electronic device, for example, a smart phone or the like, can output various pieces of information related to the multimedia data to be linked with an image of the multimedia data through audio data.

Various embodiments of the present invention provide a method of processing multimedia data by an electronic device and an electronic device therefor which, when the multimedia data is selected, can overlappingly display the various pieces of information related to the multimedia data and the image of the multimedia data.

Various embodiments of the present invention provide a method of processing multimedia data by an electronic device and an electronic device therefor which, when one or more of the various pieces of information overlappingly displayed on the image of the multimedia data are selected by a user, can provide an additional service related to the selected information.

Technical Solution

According to various embodiments of the present invention, a method of processing multimedia data by an electronic device may include: acquiring information related to the multimedia data by the electronic device; storing the acquired information and the multimedia data to be linked with each other; and when the multimedia data is selected, output the stored information to be linked with the multimedia data through audio.

According to various embodiments of the present invention, a method of processing multimedia data by an electronic device may include: when the multimedia data is selected, acquiring information related to the multimedia data by the electronic device; and outputting the acquired information to be linked with the multimedia data through audio data.

According to various embodiments of the present invention, an electronic device may include: a memory configured to store multimedia data; and a processor configured to control the memory, wherein the processor acquires information related to multimedia data when the multimedia data is stored, stores the acquired information and the multimedia data to be linked with each other, and outputs the stored information to be linked with the multimedia data through audio data when the multimedia data is selected.

According to various embodiments of the present invention, an electronic device may include: a memory configured to store multimedia data; and a processor configured to control the memory, wherein the processor acquires information related to multimedia data when the multimedia data is selected, and outputs the acquired information to be linked with the multimedia data through audio data.

Effects of the Invention

According to various embodiments of the present invention, when multimedia data is selected, an electronic device such as a smart phone may output various pieces of information related to the multimedia data to be linked with the multimedia data through audio data, so that a user can visually watch an image of the multimedia data and acoustically listen to various pieces of information at the same time. Therefore, it is possible to provide convenience to both blind people and normal users.

According to various embodiments of the present invention, when multimedia data is selected, the electronic device may overlappingly display various pieces of information related to the multimedia data on an image of the multimedia data, so that the user can visually watch the image of the multimedia data and the various pieces of information at the same time.

According to various embodiments of the present invention, when the user selects various pieces of information overlappingly displayed on the image of the multimedia data, the electronic device may provide an additional service related to the selected information, so that the user can conveniently use various additional service which the user desires, for example, a communication service, a schedule management service, and a profile search service while watching the image of the multimedia data.

MODE FOR CARRYING OUT THE INVENTION

Figure 1A:
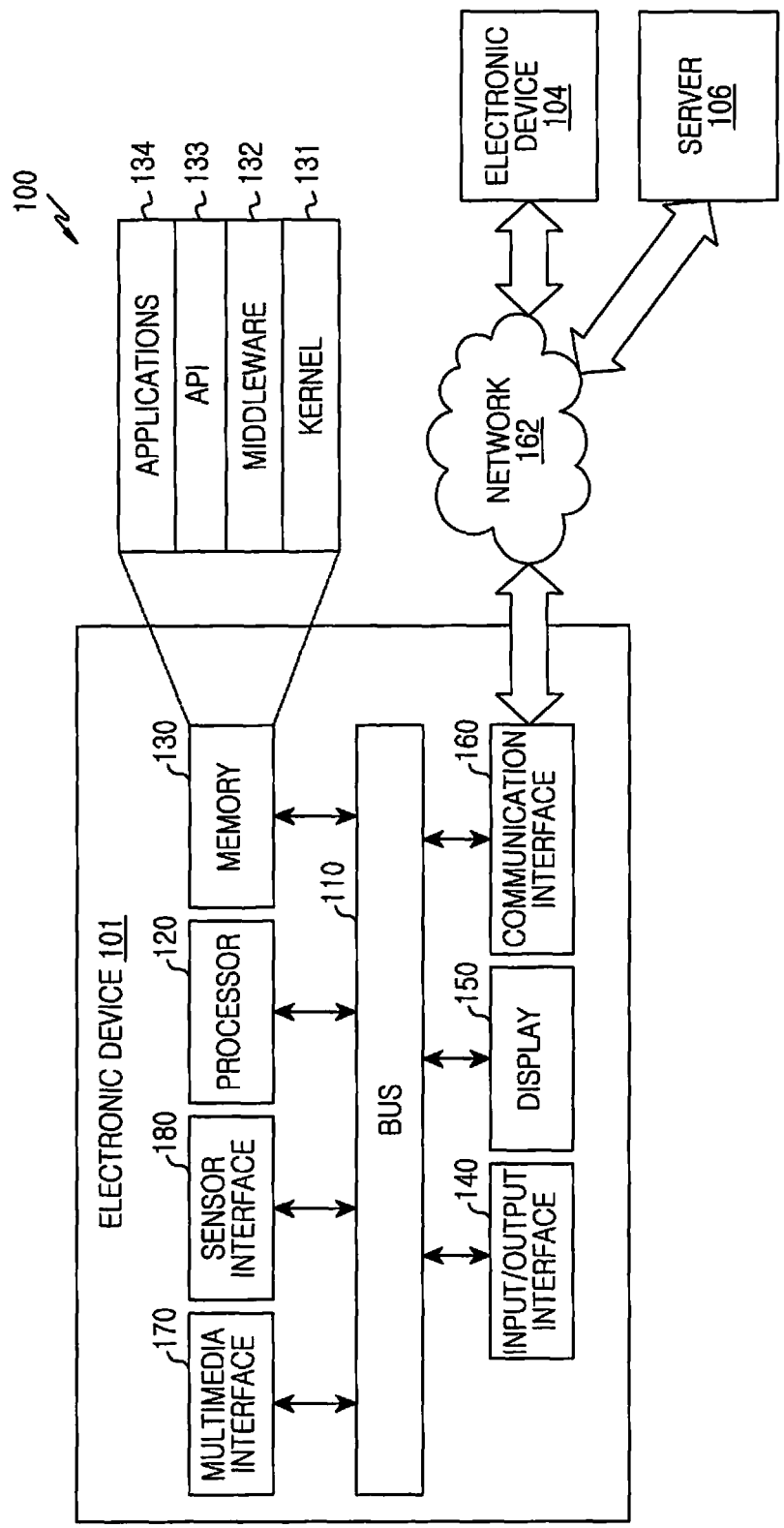
FIG. 1A illustrates a network environment including an electronic device according to various embodiments of the present invention.

Hereinafter, various embodiments of the present invention will be described with reference to the accompanying drawings. The present invention may have various embodiments, and modifications and changes may be made therein. Therefore, the present invention will be described in detail with reference to particular embodiments shown in the accompanying drawings. However, it should be understood that there is no intent to limit various embodiments of the present invention to the particular embodiments disclosed herein, but the present invention should be construed to cover all modifications, equivalents, and/or alternatives falling within the spirit and scope of the various embodiments of the present invention. In connection with descriptions of the drawings, like reference numerals designate like elements.

In the present invention, the expression "include" or "may include" refers to existence of a corresponding function, operation, or element, and does not limit one or more additional functions, operations, or elements. Further, as used in various embodiments of the present invention, the terms "include", "have", and their conjugates are intended merely to denote a certain feature, numeral, step, operation, element, component, or a combination thereof, and should not be construed to initially exclude the existence of or a possibility of addition of one or more other features, numerals, steps, operations, elements, components, or combinations thereof.

Further, as used in various embodiments of the present invention, the expression "or" includes any or all combinations of words enumerated together. For example, the expression "A or B" may include A, may include B, or may include both A and B. While expressions including ordinal numbers, such as "first" and "second", as used in various embodiments of the present invention may modify various constituent elements, such constituent elements are not limited by the above expressions. For example, the above expressions do not limit the sequence and/or importance of the elements. The above expressions are used merely for the purpose of distinguishing an element from the other elements. For example, a first user device and a second user device indicate different user devices although both of them are user devices. For example, a first element could be termed a second element, and similarly, a second element could be also termed a first element without departing from the scope of the present invention.

In the case where an element is referred to as being "connected" or "accessed" to other elements, it should be understood that not only the element is directly connected or accessed to the other elements, but also another element may exist between them. Contrarily, when an element is referred to as being "directly coupled" or "directly connected" to any other element, it should be understood that no element is interposed therebetween.

The terms as used in various embodiments of the present invention are merely for the purpose of describing particular embodiments and are not intended to limit the various embodiments of the present invention. As used herein, the singular forms are intended to include the plural forms as well, unless the context clearly indicates otherwise.

Unless defined otherwise, all terms used herein, including technical terms and scientific terms, have the same meaning as commonly understood by a person of ordinary skill in the art to which various embodiments of the present invention pertain. Such terms as those defined in a generally used dictionary are to be interpreted to have the meanings equal to the contextual meanings in the relevant field of art, and are not to be interpreted to have ideal or excessively formal meanings unless clearly defined in various embodiments of the present invention.

An electronic device according to various embodiments of the present invention may be a device including a communication function. For example, the electronic device may include at least one of a smart phone, a tablet personal computer (PC), a mobile phone, a video phone, an e-book reader, a desktop PC, a laptop PC, a netbook computer, a personal digital assistant (PDA), a portable multimedia player (PMP), an MP3 player, a mobile medical device, a camera, a wearable device (e.g., a head-mounted-device (HMD) such as electronic glasses, electronic clothes, an electronic bracelet, an electronic necklace, an electronic appcessory, an electronic tattoo, or a smart watch).

According to some embodiments, the electronic device may be a smart home appliance with a communication function. The smart home appliances may include at least one of, for example, televisions, digital video disk (DVD) players, audio players, refrigerators, air conditioners, cleaners, ovens, microwaves, washing machines, air purifiers, set-top boxes, TV boxes (e.g., HomeSync™ of Samsung, Apple TV™, or Google TV™), game consoles, electronic dictionaries, electronic keys, camcorders, or electronic frames.

According to some embodiments, the electronic device may include at least one of various medical appliances (e.g., magnetic resonance angiography (MRA), magnetic resonance imaging (MRI), computed tomography (CT), and ultrasonic machines), navigation equipment, a global positioning system (GPS) receiver, an event data recorder (EDR), a flight data recorder (FDR), automotive infotainment device, electronic equipment for ships (e.g., ship navigation equipment and a gyrocompass), avionics, security equipment, a vehicle head unit, an industrial or home robot, an automatic teller machine (ATM) of a banking system, and a point of sales (POS) of a shop.

According to some embodiments, the electronic device may include at least one of a part of furniture or a building/structure having a communication function, an electronic board, an electronic signature receiving device, a projector, and various kinds of measuring instruments (e.g., a water meter, an electric meter, a gas meter, a radio wave meter, and the like). The electronic device according to various embodiments of the present invention may be a combination of one or more of the aforementioned various devices. Further, the electronic device according to various embodiments of the present invention may be a flexible device. Further, it will be apparent to those skilled in the art that the electronic device according to various embodiments of the present invention is not limited to the aforementioned devices.

Hereinafter, an electronic device according to various embodiments of the present invention will be described with reference to the accompanying drawings. The term "user" used in various embodiments of the present invention may indicate a user who uses an electronic device or a device that uses an electronic device, such as an artificial intelligence electronic device.

Figure 1B:
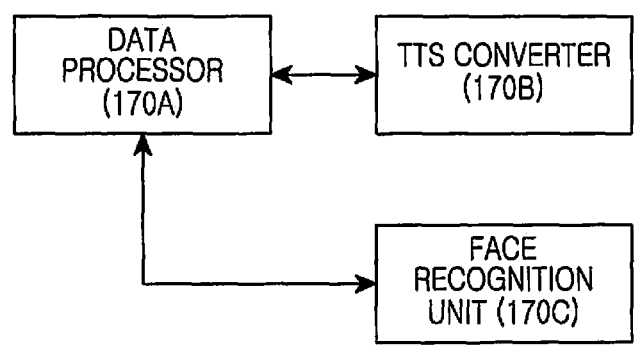
FIG. 1B illustrates an example of a configuration of a multimedia interface according to various embodiments of the present invention.

FIG. 1A illustrates a network environment 100 including an electronic device 101 according to various embodiments of the present invention. FIG. 1B illustrates an example of a configuration of a multimedia interface 170 according to various embodiments of the present invention.

Referring to FIG. 1A, the electronic device 101 may include a bus 110, a processor 120, a memory 130, an input/output interface 140, a display 150, a communication interface 160, and a multimedia interface 170.

Referring to FIG. 1B, the multimedia interface 170 may include, for example, a data processor 170a for processing data to record or reproduce various types of multimedia data, such as still images or dynamic images, a TTS (Text To Sound) converter 170b for converting text into a sound to output information related to the multimedia data as audio data, and a face recognition unit 170c for recognizing a person's face through an image scan of an image of the multimedia data.

A part or an entirety of the multimedia interface 170 may be included in the processor 120 or interwork with the processor 120 as a separate element.

The bus 110 may be a circuit that interconnects the above-described elements and delivers a communication (for example, a control message) between the above-described elements. The processor 120 may receive, for example, instructions from other elements (for example, the memory 130, the input/output interface 140, the display 150, and the communication interface 160) through the bus 110, analyze the received instructions, and execute calculations or data processing according to the analyzed instructions.

The memory 130 may store instructions or data received from, or created by, the processor 120 or other elements (for example, the input/output interface 140, the display 150, and the communication interface 160). The memory 130 may include programming modules, for example, a kernel 131, middleware 132, an Application Programming Interface (API) 133, an application 134, and the like. Each of the aforementioned programming modules may be formed of software, firmware, hardware, or a combination of at least two thereof.

The kernel 131 may control or manage system resources (for example, the bus 110, the processor 120, or the memory 130) used for executing an operation or a function implemented in the remaining other programming modules, for example, the middleware 132, the API 133, or the application 134. In addition, the kernel 131 may provide an interface through which the middleware 132, the API 133, or the applications 134 may control or manage the individual components of the electronic device 101 while accessing the individual components.

The middleware 132 may perform a relay function of allowing the API 133 or the application 134 to communicate with the kernel 131 to exchange data therewith. Further, in association with task requests received from the applications 134, the middleware 132 may control (for example, scheduling or load-balancing) the task requests by using, for example, a method of assigning, to at least one of the applications 134, a priority for using system resources (for example, the bus 110, the processor 120, the memory 130, or the like) of the electronic device 101.

The API 133 is an interface through which the applications 134 may control functions provided by the kernel 131 or the middleware 132, and may include at least one interface or function (for example, instruction) for file control, window control, image processing, or text control.

According to various embodiments of the present invention, the applications 134 may include a Short Message Service (SMS)/Multimedia Message Service (MMS) application, an e-mail application, a calendar application, an alarm application, a health care application (for example, an application for measuring an amount of exercise or blood sugar), and an environmental information application (for example, an application for providing an atmospheric pressure, humidity, temperature, and the like). Additionally or alternately, the applications 134 may be an application related to the exchange of information between the electronic device 101 and an external electronic device (for example, an electronic device 104). The application related to the exchange of information may include, for example, a notification relay application for transferring predetermined information to the external electronic device or a device management application for managing the external electronic device.

For example, the notification relay application may include a function of transferring, to the external electronic device (for example, the electronic device 104), notification information generated in other applications of the electronic device 101 (for example, an SMS/MMS application, an e-mail application, a health management application, an environmental information application, and the like). Additionally or alternatively, the notification relay application may receive notification information from, for example, an external electronic device (for example, the electronic device 1024) and may provide the received notification information to a user. The device management application may manage (for example, install, delete, or update), for example, functions for at least a part of the external electronic device (for example, the electronic device 104) communicating with the electronic device 101 (for example, turning on/off the external electronic device itself (or some elements thereof) or adjusting the brightness (or resolution) of a display), applications operating in the external electronic device, or services (for example, a telephone call service or a message service) provided from the external electronic device.

According to various embodiments of the present invention, the applications 134 may include an application designated according to an attribute (for example, a type of the electrode device) of the external electronic device (for example, the electronic device 104). For example, when the external electronic device is an MP3 player, the applications 134 may include an application related to the reproduction of music. Similarly, when the external electronic device is a mobile medical appliance, the applications 134 may include an application related to health care. According to an embodiment, the applications 134 may include at least one of applications specified to the electronic device 101 and applications received from an external electronic device (for example, a server 106 or the electronic device 104).

The input/output interface 140 may transfer instructions or data input from a user through an input/output device (for example, a sensor, a keyboard, or a touch screen) to the processor 120, the memory 130, and the communication interface 160 through, for example, the bus 110. For example, the input/output interface 140 may provide, to the processor 120, data for a user's touch input through the touch screen. In addition, through the input/output device (for example, a speaker or a display), the input/output interface 140 may output instructions or data received from the processor 120, the memory 130, or the communication interface 160 through the bus 110. For example, the input/output interface 140 may output voice data, processed through the processor 120, to a user through a speaker.

The display 150 may display various pieces of information (for example, multimedia data or text data) to a user. The communication interface 160 may connect communication between the electronic device 101 and the external electronic device (for example, the electronic device 104 or the server 106). For example, the communication interface 160 may be connected to the network 162 through wireless communication or wired communication to communicate with the external device. The wireless communication may include at least one of, for example, Wi-Fi, Bluetooth (BT), Near Field Communication (NFC), a Global Positioning System (GPS), and cellular communication (for example, LTE, LTE-A, CDMA, WCDMA, UMTS, WiBro, GSM, etc.). Also, the wired communication may include at least one of, for example, a Universal Serial Bus (USB), a High Definition Multimedia Interface (HDMI), Recommended Standard 232 (RS-232), and a Plain Old Telephone Service (POTS).

According to an embodiment of the present invention, the network 162 may be a telecommunication network. The communication network may include at least one of a computer network, the Internet, the Internet of things, and a telephone network. According to an embodiment, a protocol (for example, a transport layer protocol, data link layer protocol, or a physical layer protocol) for communication between the electronic device 101 and the external device may be supported by at least one of the application 134, the application programming interface 133, the middleware 132, the kernel 131, and the communication interface 160.

Figure 2:
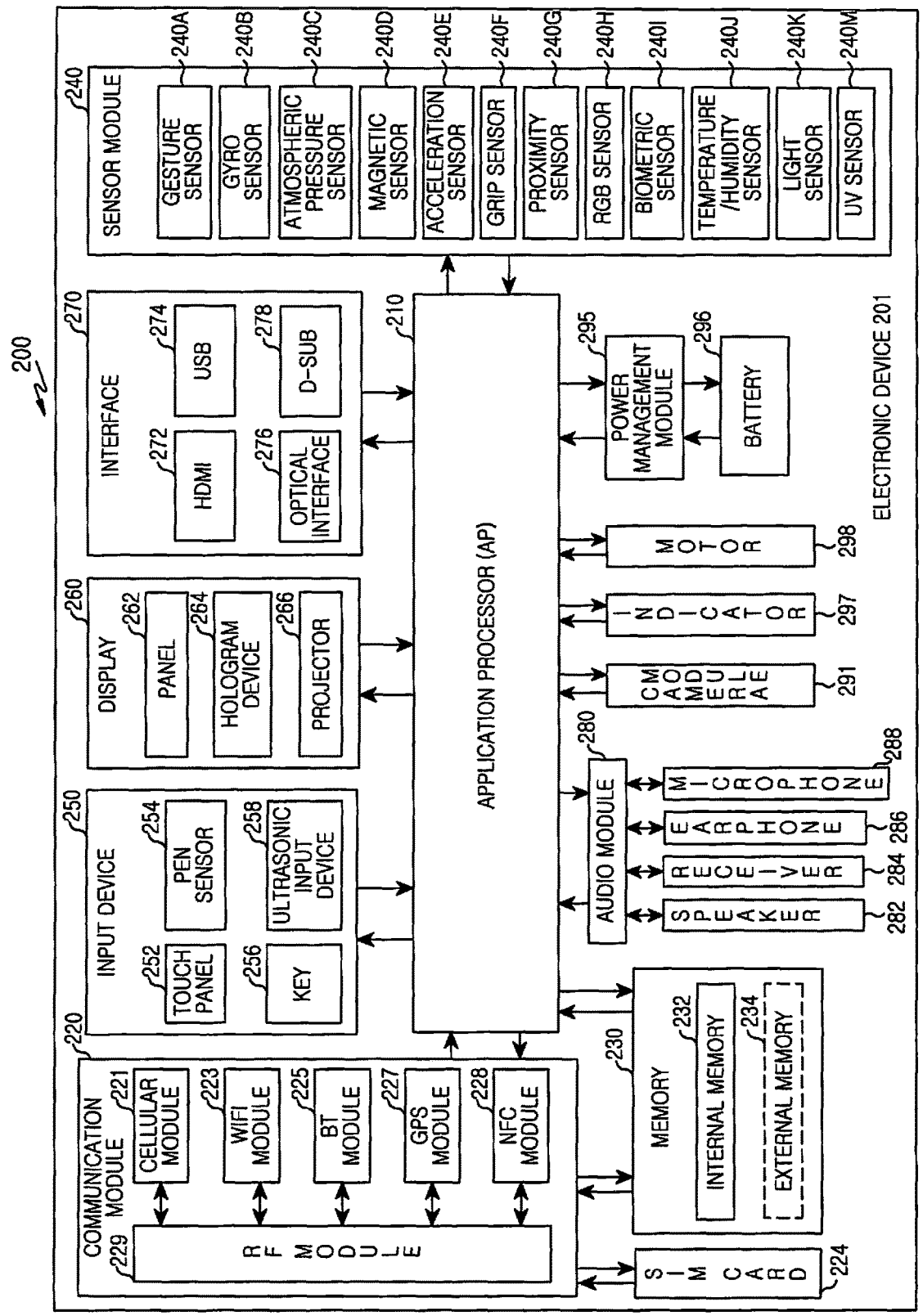
FIG. 2 is a block diagram of an electronic device according to various embodiments of the present invention.

FIG. 2 is a block diagram of an electronic device 201 according to various embodiments of the present invention. An electronic device 201 may form, for example, a part or the entirety of the electronic device 101 illustrated in FIG. 1. Referring to FIG. 2, the electronic device 201 may include at least one Application Processor (AP) 210, a communication module 220, a Subscriber Identifier Module (SIM) card 224, a memory 230, a sensor module 240, an input device 250, a display 260, an interface 270, an audio module 280, a camera module 291, a power management module 295, a battery 296, an indicator 297, and a motor 298.

The AP 210 may control a plurality of hardware or software elements connected to the AP 210 by driving an operating system or an application program and process various types of data including multimedia data and perform calculations. The AP 210 may be implemented as, for example, a system on chip (SoC). According to an embodiment, the AP 210 may further include a graphic processing unit (GPU) (not illustrated).

The communication module 220 (for example, the communication interface 160) may perform data transmission/reception in communication between the electronic device 201 (for example, the electronic device 101) and other electronic devices (for example, the electronic device 104 and the server 106) connected thereto through a network. According to an embodiment, the communication module 220 may include a cellular module 221, a Wi-Fi module 223, a BT module 225, a GPS module 227, an NFC module 228, and a radio frequency (RF) module 229.

The cellular module 221 may provide a voice call, a video call, a Short Message Service (SMS), or an Internet service through a communication network (for example, LTE, LTE-A, CDMA, WCDMA, UMTS, WiBro, OR GSM). Further, the cellular module 221 may perform identification and authentication of electronic devices in a communication network using, for example, a subscriber identification module (for example, the SIM card 224). According to one embodiment, the cellular module 221 may perform at least some functions that can be provided by the AP 210. For example, the cellular module 221 may perform at least some of the multimedia control functions.

According to an embodiment of the present invention, the cellular module 221 may include a communication processor (CP). Furthermore, the cellular module 221 may be implemented as, for example, an SoC. In FIG. 2, the elements, such as the cellular module 221 (for example, a communication processor), the memory 230, and the power management module 295, are illustrated to be separate from the AP 210. However, according to an embodiment, the AP 210 may be implemented to include at least some of the aforementioned elements (for example, the cellular module 221).

According to an embodiment of the present invention, the AP 210 or the cellular module 221 (for example, the CP) may load instructions or data received from at least one of a non-volatile memory and other components connected thereto into a volatile memory and process the loaded instructions or data. Furthermore, the AP 210 or the cellular module 221 may store, in a non-volatile memory, data received from or generated by at least one of other component elements.

The Wi-Fi module 223, the BT module 225, the GPS module 227, and the NFC module 228 may include, for example, a processor for processing data transmitted/received through a corresponding module. In FIG. 2, the cellular module 221, the Wi-Fi module 223, the BT module 225, the GPS module 227, and the NFC module 228 are illustrated as separate blocks. However, according to an embodiment, at least some (for example, two or more) of the cellular module 221, the Wi-Fi module 223, the BT module 225, the GPS module 227, and the NFC module 228 may be included in one integrated chip (IC) or one IC package. For example, at least some (for example, the communication processor corresponding to the cellular module 221 and the Wi-Fi processor corresponding to the Wi-Fi module 223) of the processors corresponding to the cellular module 221, the Wi-Fi module 223, the BT module 225, the GPS module 227, and the NFC module 228 may be implemented as one SoC.

The RF module 229 may transmit/receive data, for example, an RF signal. Although not illustrated, the RF module 229 may, for example, include a transceiver, a power amp module (PAM), a frequency filter, a low noise amplifier (LNA), or the like. Also, the RF module 229 may further include. Further, the RF module 239 may further include a component for transmitting and receiving electromagnetic waves in a free space in a wireless communication, for example, a conductor, a conductive wire, or the like. Although the cellular module 221, the Wi-Fi module 223, the BT module 225, the NFC module 227, and the GPS module 228 share one RF module 229 in FIG. 2, at least one of the cellular module 221, the Wi-Fi module 223, the BT module 225, the NFC module 227, and the GPS module 228 may transmit/receive an RF signal through a separate RF module according to an embodiment.

The SIM card 224 may be a card including a subscriber identification module, and may be inserted into a slot formed in a particular portion of the electronic device. The SIM card 224 may include unique identification information (for example, an Integrated Circuit Card IDentifier (ICCID)) or subscriber information (for example, an International Mobile Subscriber IDentity (IMSI)).

The memory 230 (for example, the memory 130) may include an internal memory 232 or an external memory 234. The internal memory 232 may include, for example, at least one of a volatile memory (for example, a Dynamic RAM (DRAM), a Static RAM (SRAM), and a Synchronous Dynamic RAM (SDRAM)), and a non-volatile Memory (for example, a One Time Programmable ROM (OTPROM), a Programmable ROM (PROM), an Erasable and Programmable ROM (EPROM), an Electrically Erasable and Programmable ROM (EEPROM), a mask ROM, a flash ROM, a NAND flash memory, and an NOR flash memory).

According to an embodiment, the internal memory 232 may be a Solid State Drive (SSD). The external memory 234 may further include a flash drive, for example, a Compact Flash (CF), a Secure Digital (SD), a Micro Secure Digital (Micro-SD), a Mini Secure Digital (Mini-SD), an extreme Digital (xD), a memory stick, or the like. The external memory 234 may be functionally connected with the electronic device 201 through various interfaces. According to an embodiment, the electronic device 201 may further include a storage device (or storage medium) such as a hard drive.

The sensor module 240 may measure a physical quantity or detect an operational state of the electronic device, and may convert the measured or detected information into an electric signal. The sensor module 240 may include at least one of, for example, a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (for example, red, green, and blue (RGB) sensor), a biometric sensor 240I, a temperature/humidity sensor 240J, an illumination sensor 240K, and a Ultra Violet (UV) sensor 240M. Additionally or alternatively, the sensor module 240 may include, for example, an E-nose sensor (not illustrated), an electromyography (EMG) sensor (not illustrated), an electroencephalogram (EEG) sensor (not illustrated), an electrocardiogram (ECG) sensor (not illustrated), an Infrared (IR) sensor (not illustrated), an iris sensor (not illustrated), and a fingerprint sensor (not illustrated). The sensor module 240 may further include a control circuit for controlling one or more sensors included therein.

The input device 250 may include a touch panel 252, a (digital) pen sensor 254, a key 256, or an ultrasonic input device 258. The touch panel 252 may detect a touch input in at least one of, for example, a capacitive type, a resistive type, an infrared type, or an ultrasonic wave type. Further, the touch panel 252 may further include a control circuit. In case of the capacitive type touch panel, physical contact or proximity detection is possible. The touch panel 252 may further include a tactile layer. In this event, the touch panel 252 may provide a tactile response to the user.

The (digital) pen sensor 254 may be implemented, for example, using a method that is the same as or similar to receiving a user's touch input, or using a separate recognition sheet. The key 256 may include, for example, a physical button, an optical key, or a keypad. The ultrasonic input device 258 may identify data by detecting an acoustic wave with a microphone (for example, a microphone 288) of the electronic device 201 through an input unit generating an ultrasonic signal, and may perform wireless detection. According to an embodiment, the electronic device 201 may also receive a user input from an external device (for example, a computer or a server) connected thereto by using the communication module 220.

The display 260 (for example, the display 150) may include a panel 262, a hologram device 264, or a projector 266. The panel 262 may be, for example, a Liquid Crystal Display (LCD) and an Active Matrix Organic Light Emitting Diode (AM-OLED) display, and the like. The panel 262 may be implemented so as to be, for example, flexible, transparent, or wearable. The panel 262 may be integrated with the touch panel 252 to configure one module. The hologram device 264 may show a stereoscopic image in the air by using interference of light. The projector 266 may project light onto a screen to display an image. The screen may be located, for example, inside or outside the electronic device 201. According to an embodiment, the display 260 may further include a control circuit for controlling the panel 262, the hologram device 264, or the projector 266.

The interface 270 may include, for example, a high-definition multimedia interface (HDMI) 272, a universal serial bus (USB) 274, an optical interface 276, or a D-subminiature (D-sub) 278. The interface 270 may be included in, for example, the communication interface 160 illustrated in FIG. 1. Additionally or alternatively, the interface 270 may include, for example, a mobile high-definition link (MHL) interface, a secure digital (SD) card/multi-media card (MMC) interface, or an infrared data association (IrDA) standard interface.

The audio module 280 may bilaterally convert a sound and an electronic signal. At least some elements of the audio module 280 may be included in, for example, the input/output interface 140 illustrated in FIG. 1. The audio module 280 may process sound information input or output through, for example, the speaker 282, the receiver 284, the earphones 286, the microphone 288 or the like.

The camera module 291 is a device that can take still and moving images, and according to an embodiment, may include one or more image sensors (for example, a front sensor or a rear sensor, not shown), a lens (not shown), an image signal processor (ISP) (not shown), or a flash (for example, an LED or a xenon lamp, not shown). The power management module 295 may manage power of the electronic device 201. Although not illustrated, the power management module 295 may include, for example, a Power Management Integrated Circuit (PMIC), a charger Integrated Circuit (IC), or a battery or fuel gauge.

The PMIC may be mounted, for example, in integrated circuits or SoC semiconductors. The charging methods may be classified into wired charging and wireless charging. The charger IC may charge a battery and prevent inflow of excessive voltage or excessive current from a charger. According to an embodiment, the charger IC may include a charger IC for at least one of the wired charging and the wireless charging. Examples of the wireless charging may include magnetic resonance charging, magnetic induction charging, and electromagnetic charging, and an additional circuit such as a coil loop, a resonance circuit, a rectifier or the like may be added for the wireless charging.

The battery gauge may measure, for example, a remaining quantity of the battery 296, or a voltage, a current, or a temperature during charging. The battery 296 may store or generate electricity, and may supply power to the electronic device 201 by using the stored or generated electricity. The battery 696 may include, for example, a rechargeable battery or a solar battery.

The indicator 297 may display a specific status of the electronic device 201 or a part (for example, the AP 210) of electronic device, for example, a booting status, a message status, a charging status, and the like. The motor 298 can convert an electrical signal into a mechanical vibration. Although not illustrated, the electronic device 201 may include a processing unit (for example, GPU) for supporting a mobile TV. The processing unit for supporting the mobile TV may process media data according to a standard of Digital Multimedia Broadcasting (DMB), Digital Video Broadcasting (DVB), media flow or the like.

Each of the above described elements of the electronic device according to various embodiments of the present invention may be formed of one or more components, and the name of a corresponding element may vary according to the type of an electronic device. The electronic device according to various embodiments of the present invention may include at least one of the above described elements and may exclude some of the elements or further include other additional elements. Further, some of the elements of the electronic device according to various embodiments of the present invention may be coupled to form a single entity while performing the same functions as those of the corresponding elements before the coupling.

Hereinafter, a method of processing multimedia data by an electronic device and an electronic device therefor according to various embodiments of the present invention will be described in detail. The electronic device according to various embodiments of the present invention may be various types of electronic devices, such as a smart phone, a tablet Personal Computer (PC), or the like, and may be configured to include some or the entirety of the components illustrated in FIGS. 1A, 1B and 2.

According to various embodiments of the present invention, when multimedia data is stored, the electronic device 101 may acquire information related to the multimedia data, store the acquired information to be linked with the multimedia data, and, when the multimedia data is selected, output the stored information to be linked with the multimedia data through audio data.

According to various embodiments of the present invention, when the multimedia data is selected, the electronic device 101 may acquire information related to the multimedia data and then output the acquired information to be linked with the multimedia data through audio data.

According to various embodiments of the present invention, the information related to the multimedia data may include at least one of a file type, weather, a category, a person name, and brightness, and a person's name information may be acquired based on the person's face feature information extracted from the multimedia data and the person's face feature information extracted from profile information stored in the electronic device through an execution of a person's face recognition application.

According to various embodiments of the present invention, the stored information may output through at least one piece of audio data of which orders are changed according to a context-specific priority and audio data of a sentence formed through a combination or a connection of a plurality of elements.

According to various embodiments of the present invention, the electronic device 101 may display the information related to the multimedia data overlappingly on an image of the multimedia data and, when the information overlappingly displayed on the image of the multimedia data is selected, may provide an additional service related to the selected information.

Figure 3:
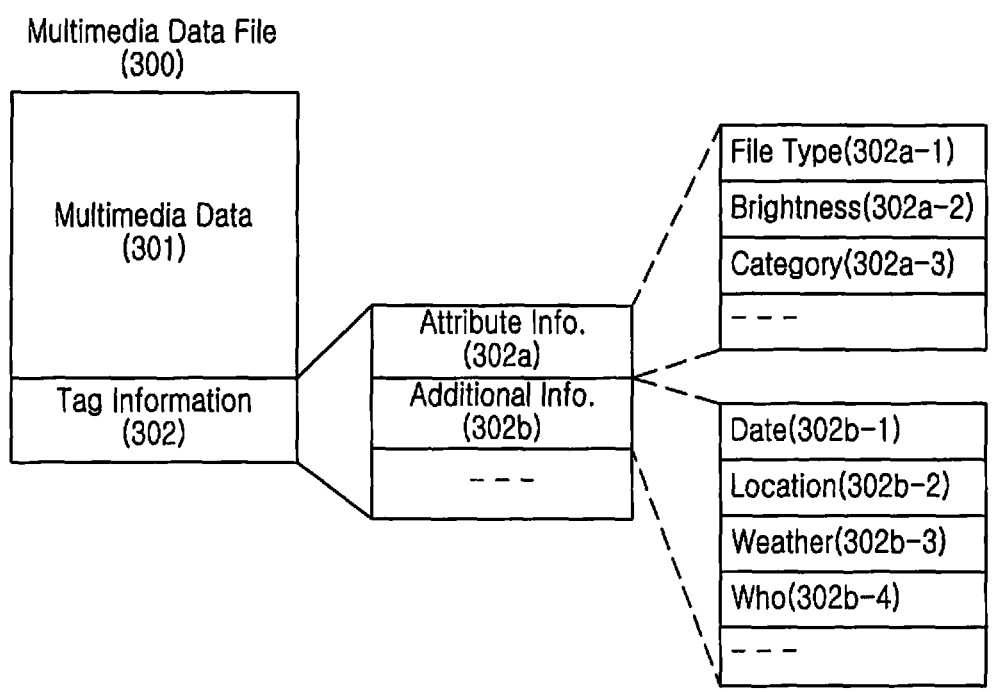
FIG. 3 illustrates an example of a configuration of a multimedia data file according to various embodiments of the present invention.

FIG. 3 illustrates a configuration of a multimedia data file according to various embodiments of the present invention. Referring to FIG. 3, the multimedia data file 300 may include various types of multimedia data 301, such as still images or dynamic images and tag information 302 related to the multimedia data.

The tag information 302 may include, for example, attribute information 302*a* and additional information 302*b*, and the attribute information 302*a* may correspond to information indicating, for example, attributes of the multimedia data and may include a file type 302*a*-1, a brightness 302*a*-2, or a category 302*a*-3.

The additional information 302*b* may correspond to, for example, information that additionally explains an image of the multimedia data and may include a date 302*b*-1 when the multimedia data file 300 is stored, a location 302*b*-2, weather 302*b*-3, or a person's name corresponding to who 302*b*-4 indicating a person's face within the image of the multimedia data.

The additional information 302*b* may be included in, for example, the tag information 302 or may be stored inside or outside the electronic device as separate log information associated with the multimedia data.

When the multimedia data file 300 is stored, the additional information 302*b* may be acquired through each operation module within the electronic device 101 and then stored in the tag information or the log information. When the multimedia data file 300 is reproduced, the additional information 302b may be searched for in the tag information or the log information and then reproduced as audio data together with the image of the multimedia data 301.

The additional information 302b may be overlappingly displayed by various types of sub screens together with the image of the multimedia data 301. Further, the additional information 302b may be output as audio data together with the attribute information 302a or overlappingly displayed by the sub screens.

When the user selects a predetermined one piece of the overlappingly displayed attribute information or additional information, the electronic device 101 may provide various additional services, such as a communication service, a schedule management service, or a profile search service according to the selected information.

Figure 4:
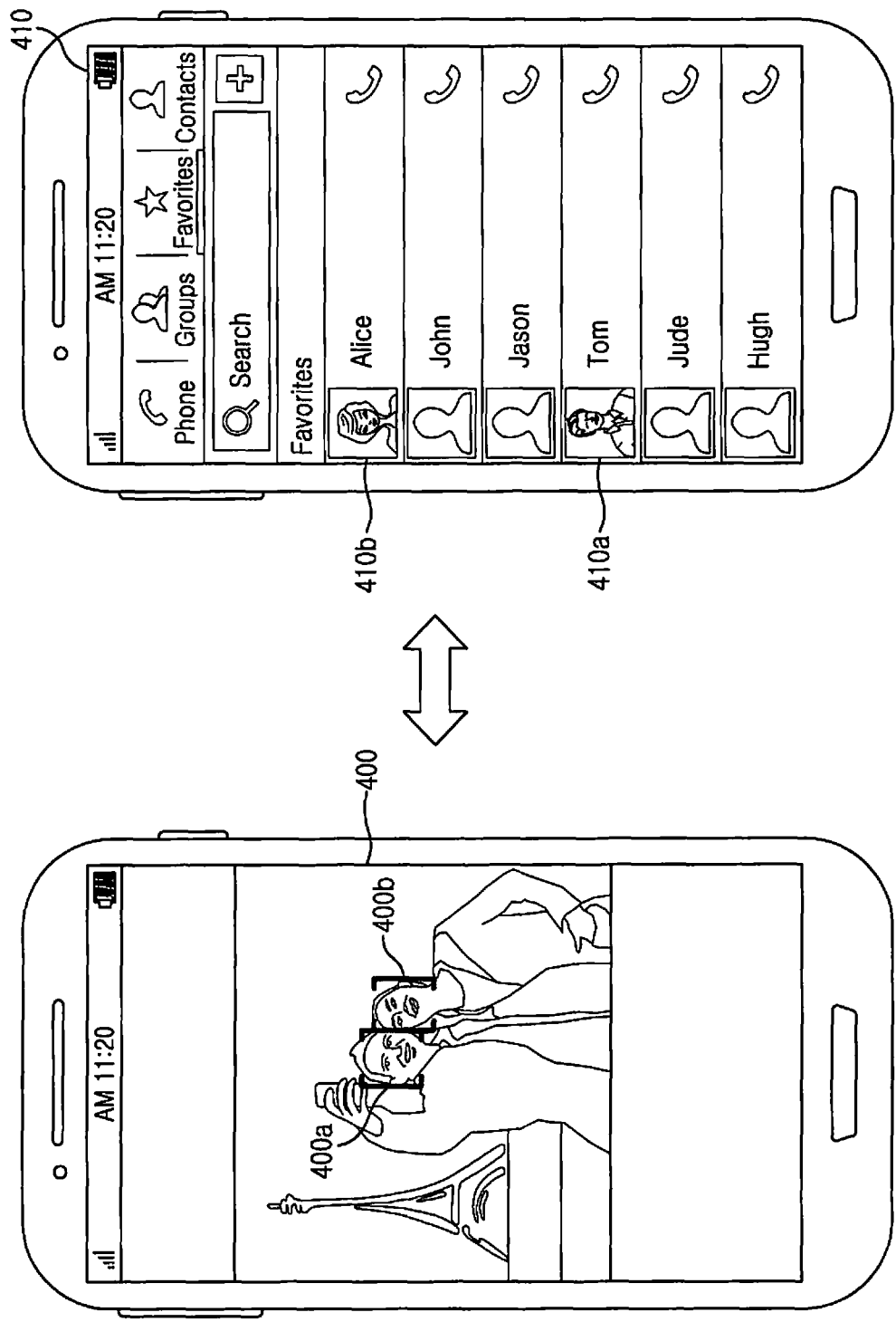
FIG. 4 illustrates an example of a process in which the electronic device performs a face recognition operation according to various embodiments of the present invention.

FIG. 4 illustrates an example of a process in which the electronic device performs a face recognition operation according to various embodiments of the present invention. For example, the processor 120 of the electronic device 101 may install and execute a face recognition application that can recognize a person's face through an image scan operation.

The face recognition application may perform the image scan operation on the image of the multimedia data and extract feature information of the person's face included in the image.

The face recognition application may search for, for example, images (for example, photos) from profiles of a plurality of people stored in the electronic device 101 as contact information, and then extract feature information of a person's face included in each of the images.

The processor 120 may compare the extracted person's face feature information, search for a name of a person who is equal or similar to a person included in the image of the multimedia data in the profile information, and then store the found name to be linked with tag information of the multimedia data file as additional information.

Referring to FIG. 4, when the face recognition application is executed and the image scan operation for the image of the multimedia data 400 is performed, a first indicator 400a may be overlappingly displayed on a person's face included in the image, for example, a man's face of FIG. 4 and a second indicator 400b may be overlappingly displayed on a woman's face of FIG. 4.

Further, the contact information 410 of FIG. 4 may include profile information 410a including a photo and a name (for example, Tom) of the man on which the first indicator 400a is overlappingly displayed and profile information 410b including a photo and a name (for example, Alice) of the woman on which the second indicator 400b is overlappingly displayed.

Accordingly, the processor 120 may compare the face feature information extracted from the image 400 with face feature information extracted from the profile information 410, search for the name (for example, Tom or Alice) of the specific person who matches or is similar, and store the found name of the specific person as additional information.

Figure 5:
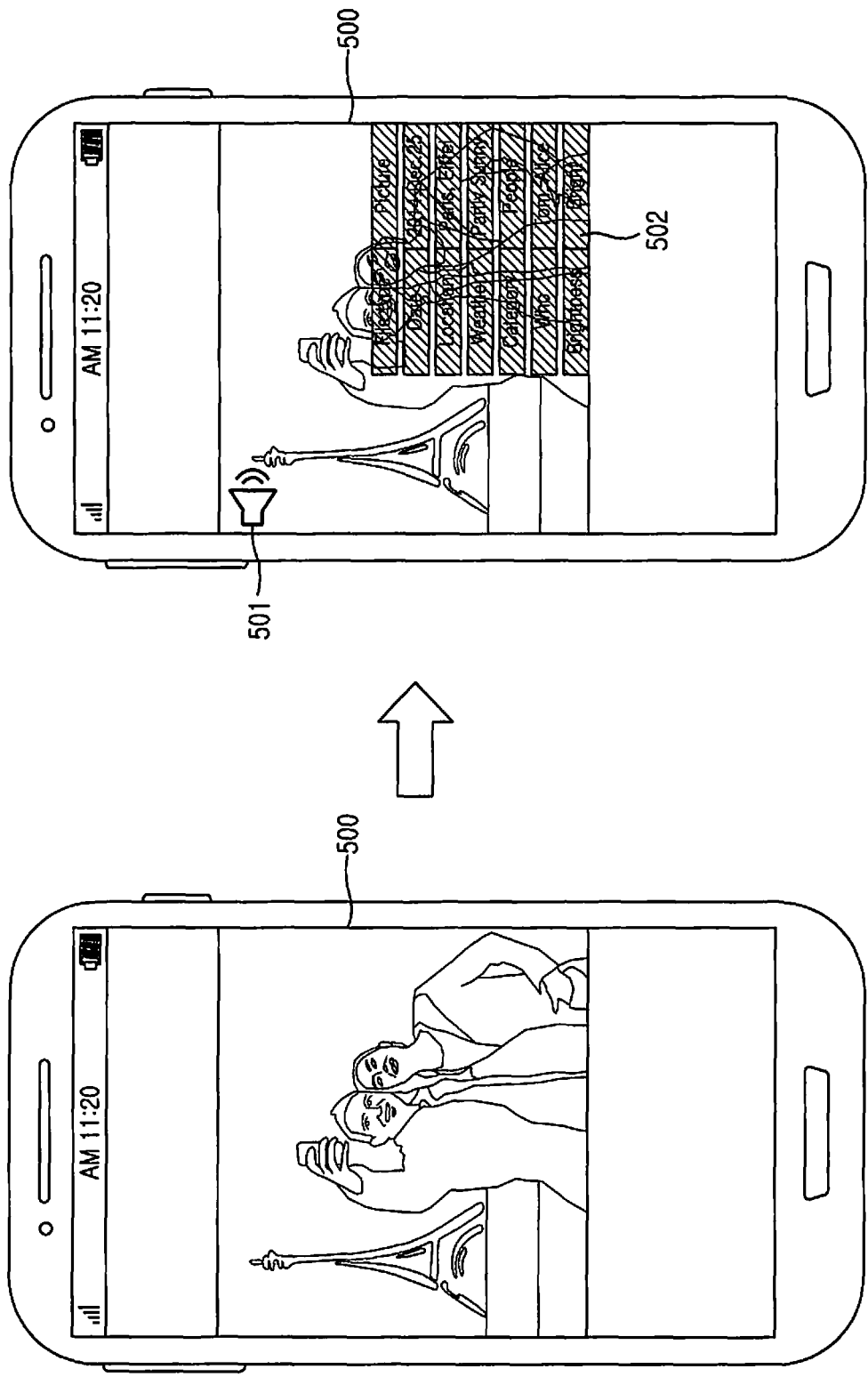
FIG. 5 illustrates an example in which the electronic device outputs information related to an image through audio data and sub screens according to various embodiments of the present invention.

FIG. 5 illustrates an example in which the electronic device outputs information related to an image through audio data and sub screens according to various embodiments of the present invention. When the multimedia data file 300 is reproduced, the processor 120 of the electronic device 101 may display the image of the multimedia data 301 and also output the attribute information 302a and the additional information 302b included in the tag information 302 of the multimedia data file 300 as audio data, so as to output a sound together when the image of the multimedia data.

Further, the processor 120 may generate various types of sub screens by signal-processing at least one of the attribute information and the additional information, and then overlappingly display the sub screens on the image of the multimedia data.

Referring to FIG. 5, the processor 120 may display an image 500 including a man's face and a woman's face by reproducing the multimedia data file 300 and extract the attribute information 302a and the additional information 302b from the tag information 302 of the multimedia data file 300 to output the extracted information as audio data.

Here, a speaker-shaped icon 501 indicating that the audio data is being output may be overlappingly displayed on the displayed screen, and the audio data may be, for example, audio data through which the file type, photo, date, location, weather, category, person's name, or brightness extracted from the tag information is read by a voice selected by the user or according to a predetermined order, intonation, or pronunciation.

Further, sub screens 502 for visually displaying, for example, the file type, photo, date, location, weather, category, person's name, or brightness may be overlappingly displayed on the image 500.

Here, the sub screens 502 may be variously displayed according to a user's selection or a predetermined brightness, transparency, or color, and may be output together with the audio data or output separately from the audio data.

Figure 6:
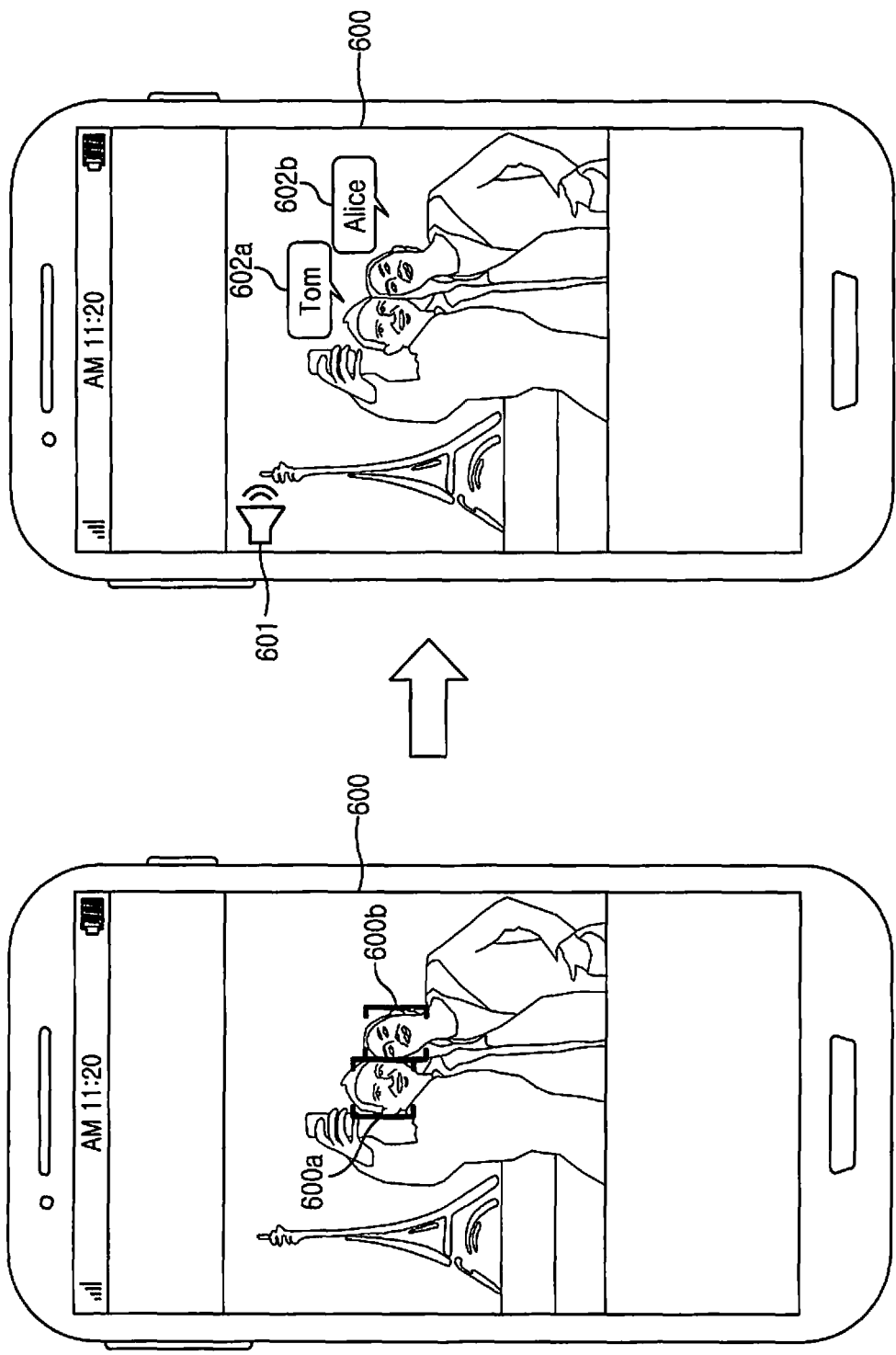
FIG. 6 illustrates an example in which the electronic device outputs information related to the image through audio data and speech bubbles according to various embodiments of the present invention.

FIG. 6 illustrates an example in which the electronic device outputs information related to the image through audio data and speech bubbles according to various embodiments of the present invention. When the multimedia data file 300 is reproduced, the processor 120 of the electronic device 101 may display the image of the multimedia data 301 and may also perform the image scan operation on the image to recognize the people's faces.

The processor 120 may output information related to the image through audio data and speech bubbles. Referring to FIG. 6, the processor 120 may perform the image scan operation on an image 600 to recognize a man's face and a woman's face included in the image 600.

The processor 120 may overlappingly display a first indicator 600a on the man's face and a second indicator 600b on the woman's face, and may output attribute information and additional information related to the image 600 through audio data, so as to output a sound.

The processor 120 may overlappingly display a speaker-shaped icon 601 indicating that the audio data is being output, a speech bubble 602a indicating a man's name (for example, Tom) near the man's face, and a speech bubble 602b indicating a woman's name (for example, Alice) near the woman's face on the image 600.

Here, the icon 610c and the speech bubbles 602a and 602b may be variously overlappingly displayed according to a user's selection or a predetermined shape, transparency, color, or brightness.

Figure 7:
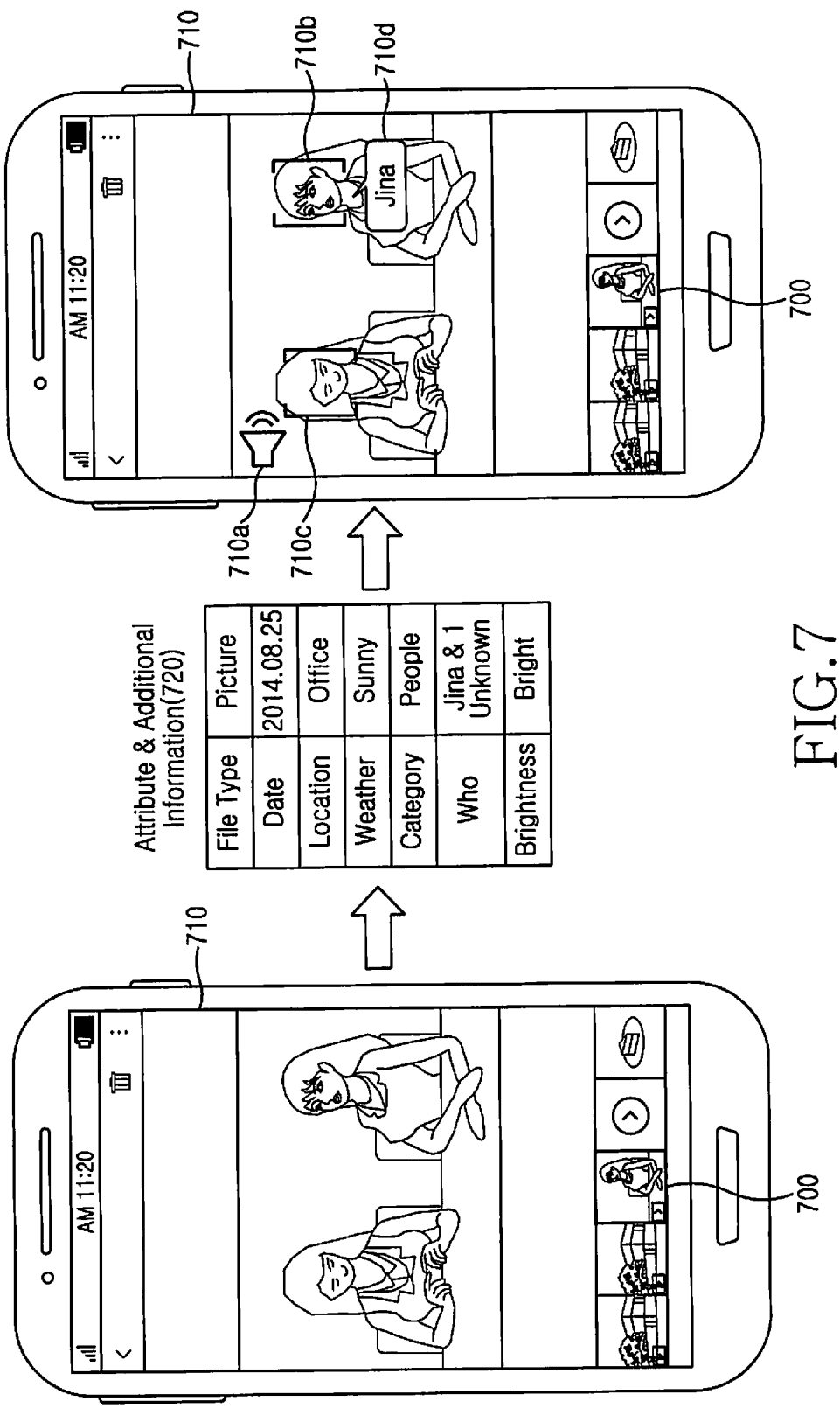
FIG. 7 illustrates an example in which the electronic device outputs information related to an image for a thumbnail image selected by the user through audio data and speech bubbles according to various embodiments of the present invention.

FIG. 7 illustrates an example in which the electronic device outputs information related to an image for a thumbnail image selected by the user through audio data and speech bubbles according to various embodiments of the present invention. The processor 120 of the electronic device 101 may display, for example, several photos stored in the electronic device 101 through a plurality of thumbnail images.

Referring to FIG. 7, when the user selects a predetermined thumbnail image 700, the processor 120 may display a photo image 710 corresponding to the thumbnail image on the screen, search for information 720 related to the displayed photo image, and then variously output the information through audio data and speed bubbles.

A speaker-shaped icon 710a, indicators 710b and 710c, and a speech bubble 710d indicating a person's name may be overlappingly displayed on the photo image 710 displayed on the screen.

Here, the audio data may be a sound through which various pieces of information, for example, a file type, date, location, weather, category, person's name, and brightness are read. When no face is recognized or a person whose name cannot be known is detected, a sound of reading "Dina and one person are found" may be output.

Figure 8:
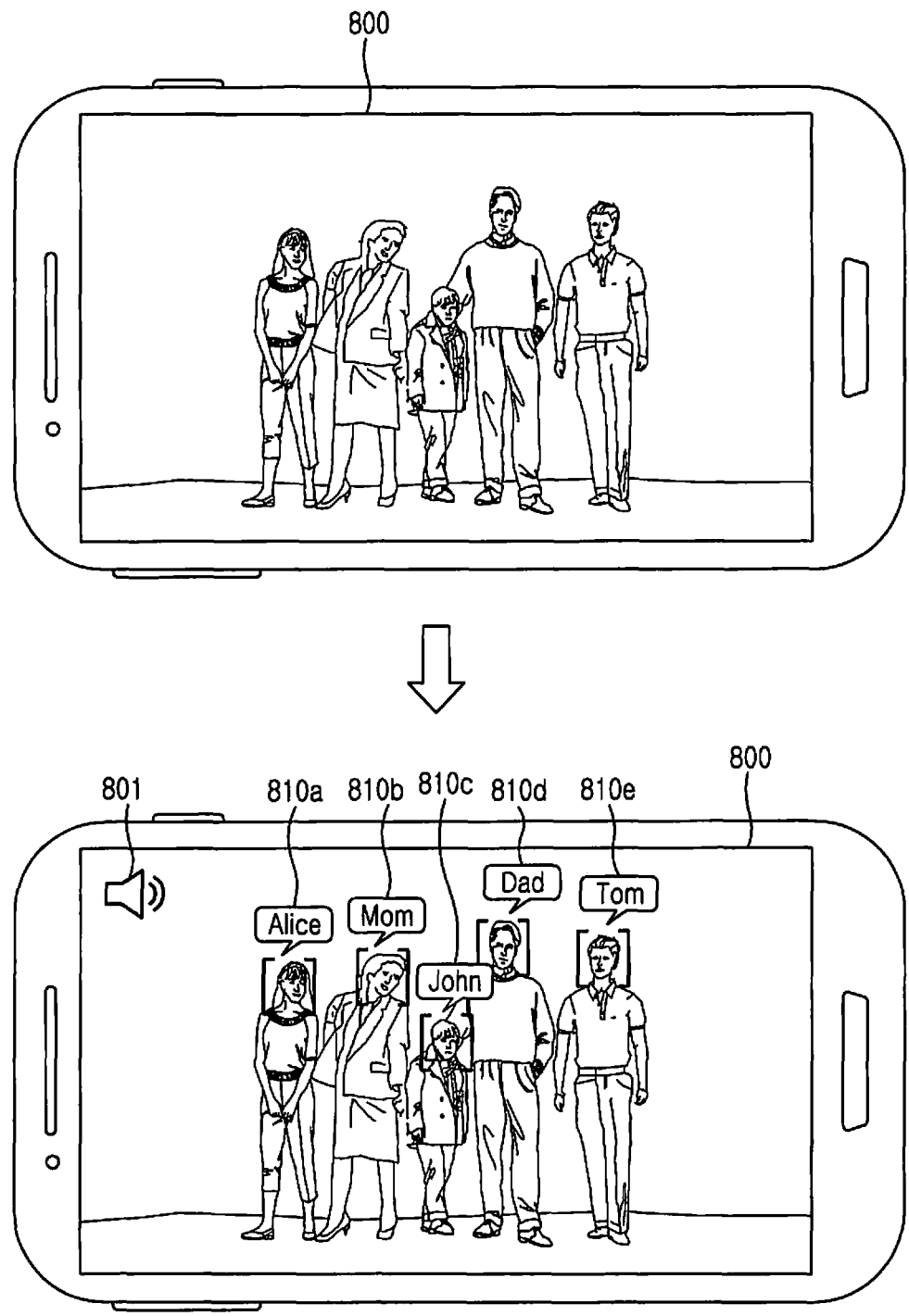
FIG. 8 illustrates an example in which the electronic device outputs information related to an image including several people through audio data and speech bubbles according to various embodiments of the present invention.

FIG. 8 illustrates an example in which the electronic device outputs information related to an image including several people through audio data and speech bubbles according to various embodiments of the present invention. When an image such as a photo image including, for example, several people is displayed, the processor 120 of the electronic device 101 may variously read the names of the several people according to a user's selection or a predetermined order and method.

Referring to FIG. 8, when a photo image including, for example, five people is displayed through an image 800, the processor 120 may overlappingly display indicators on the faces of the five people, respectively, and overlappingly display names of the five people through speech bubbles 810a to 810e.

The processor 120 may overlappingly display a speaker-shaped icon 801 on the image 800 and output information related to the image through audio data. Here, the names (for example, Tom, Alice, Dad, Mom, and John) of the five people may be variously read according to user's selection or a predetermined order and method.

For example, based on the user himself/herself who is an owner of the electronic device 101, a name of a person close to the user may be first read or a name of a person located in a particular direction (for example, a clockwise direction or a counterclockwise direction) from the user may be read first.

Further, a name of a person whose face is recognized to be the largest may be read first according to an order of the larger face size, or the names of people determined based on intimacy with families, friends, or colleagues, may be first read.

Figure 9:
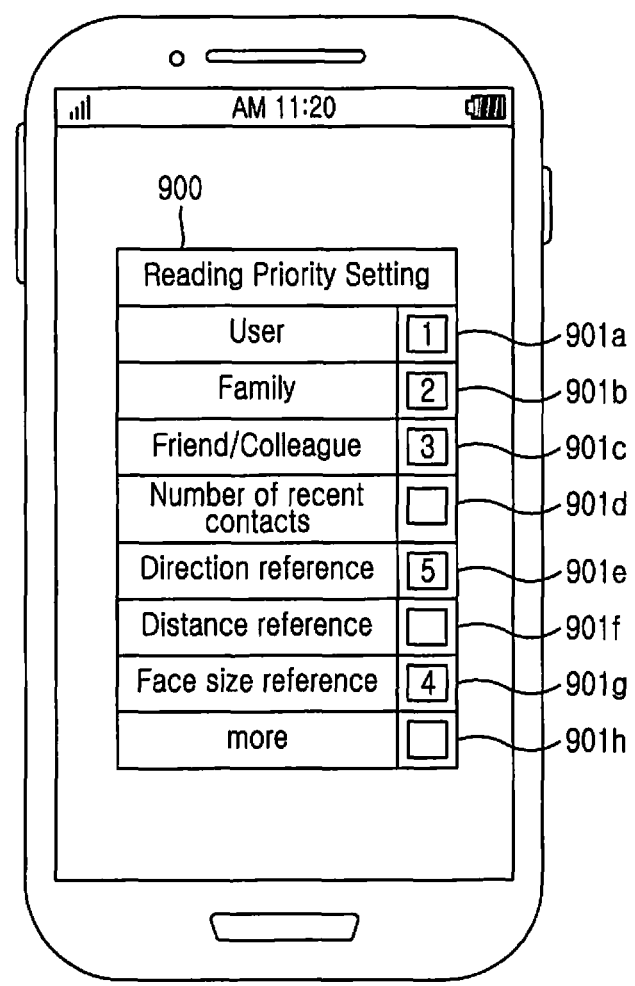
FIG. 9 illustrates an example of a reading priority setting screen according to various embodiments of the present invention.

FIG. 9 illustrates an example of a reading priority setting screen according to various embodiments of the present invention. For example, when the names of the several people included in the image are read through audio data, the processor 120 of the electronic device 101 may variously read the names according to user's selection or a predetermined priority.

Referring to FIG. 9, the processor 120 may display, for example, a reading priority setting screen 900 as one of user selection menu screens. The reading priority setting screen 900 may include various user selection items. For example, various selection items 901a to 901h such as the user himself/herself, family, friend/colleague, a number of recent contacts, a direction reference, a distance reference, and a face size reference may be included.

The user may set the user himself/herself to have a first priority, the family to have a second priority, the friend/colleague to have a third priority, the face size reference to have a fourth priority, and the direction reference to have a fifth priority through, for example, the reading priority setting screen. In this case, the processor 120 may read the names of the several people through audio data according to the priorities.

Here, the processor 120 may determine the names of the several people as the user himself/herself, the family, or the friend/colleague with reference to various pieces of profile information such as contact information or Social Network Service (SNS) information stored in and managed by the electronic device.

Figure 10:
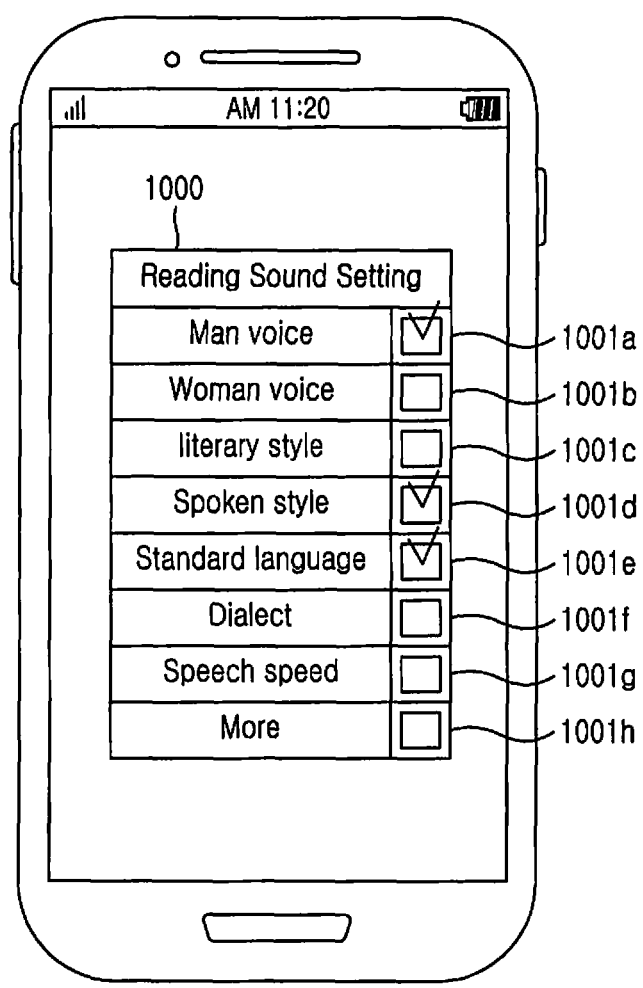
FIG. 10 illustrates an example of a reading sound setting screen according various embodiments of the present invention.

FIG. 10 illustrates an example of a reading sound setting screen according various embodiments of the present invention. For example, when the names of several people included in an image are read through audio data, the processor 120 of the electronic device 101 may variously read the names according a user's selection or a predetermined voice, intonation, or speed.

Referring to FIG. 10, the processor 120 may display, for example, a reading sound setting screen 1000 as one of user selection menu screens. The reading sound setting screen 1000 may include various user selection items. For example, various selection items 1001a to 1001h such as a man voice, a woman voice, a literary style, a spoken style, a standard language, a dialect, and a speech speed may be included.

The user may set the man voice, the spoken style, and the standard language as the reading sound through the reading sound setting screen 1000. In this case, the processor 120 may variously read information related to the image through a sound that meets the conditions of the man voice, the spoken style, and the standard language.

Figure 11:
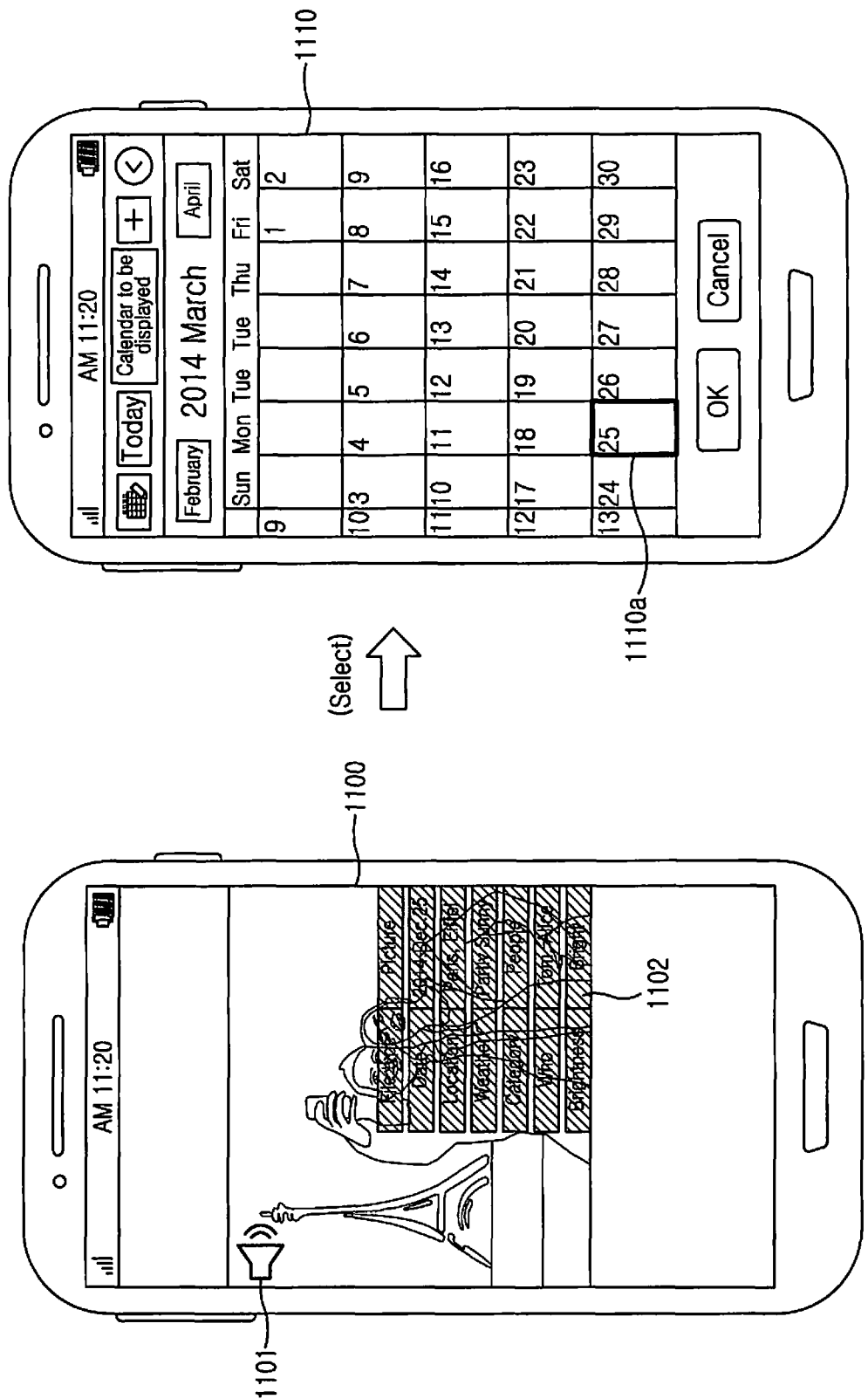
FIG. 11 illustrates an example of a process in which the electronic device provides a schedule management service according to various embodiments of the present invention.

FIG. 11 illustrates an example of a process in which the electronic device provides a schedule management service according to various embodiments of the present invention. For example, when an image 1100 is displayed, the processor 120 of the electronic device 101 may overlappingly display a speaker-shaped icon 1101 and sub screens 1102 showing information related to the image on the image 1100. When a predetermined piece of information overlappingly displayed on the image is selected by the user, the processor 120 may provide various additional services corresponding to the selected information.

Referring to FIG. 11, when the user selects date information from the information overlappingly displayed on the image 1100, the processor 120 may allow the user to more conveniently use the schedule management service by displaying a schedule planner that displays the selected date.

Here, the date information overlappingly displayed on the image may be conveniently selected by the user through, for example, a touch action, and may include link information for a link with the schedule planner.

Figure 12:
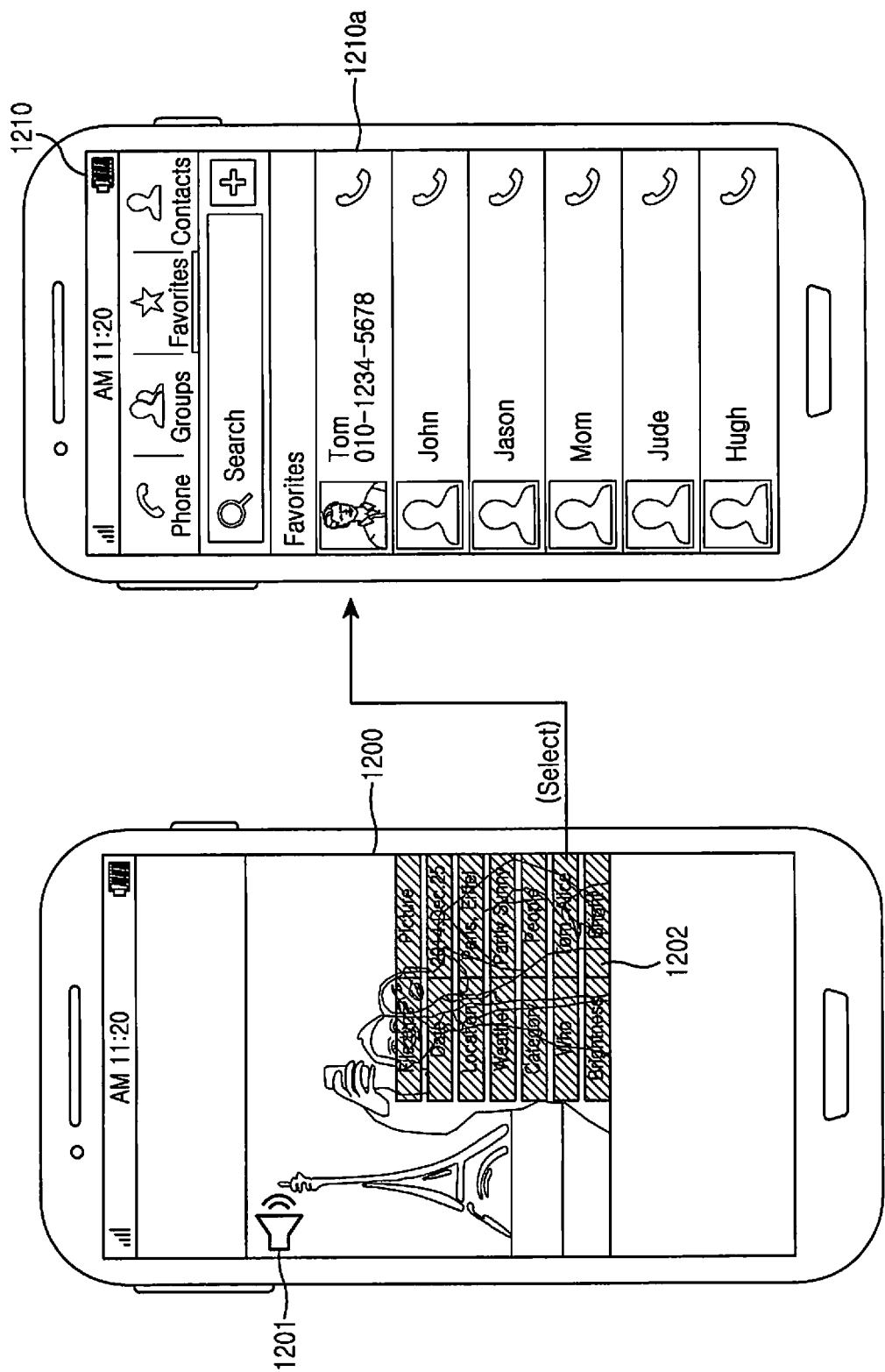
FIG. 12 illustrates an example of a process in which the electronic device provides a profile search service according to various embodiments of the present invention.

FIG. 12 illustrates an example of a process in which the electronic device provides a profile search service according to various embodiments of the present invention. For example, when an image 1200 is displayed, the processor 120 of the electronic device 101 may overlappingly display a speaker-shaped icon 1201 and sub screens 1202 showing information related to the image on the image 1200. When a predetermined piece of information overlappingly displayed on the image is selected by the user, the processor 120 may provide various additional services corresponding to the selected information.

Referring to FIG. 12, when the user selects person's name information from the information overlappingly displayed on the image 1200, the processor 120 may allow the user to more conveniently use the profile search service by displaying profile information 1210a of contacts 1210 of the displayed selected name.

Here, the name information overlappingly displayed on the image may be conveniently selected by the user through, for example, a touch action, and may include link information to be linked with the profile. The user may conveniently use various communication services such as a call service, a Short Messaging Service (SMS), or a Social Network Service (SNS) based on phone numbers linked to the profile.

FIGS. 13A to 13D are flowcharts illustrating an operation of a method of processing multimedia data by an electronic device according to various embodiments of the present invention. As described above with reference to FIGS. 1A and 1B, some or all of the data processor 170a, the TTS converter 170b, and the face recognition unit 170c included in the multimedia interface 170 may be included in the processor 120 or may interwork with the processor 120 as a separate element. As one of various embodiments of the present invention, a case where the multimedia interface 170 is included in the processor 120 is described as an example in detail.

Figure 13A:
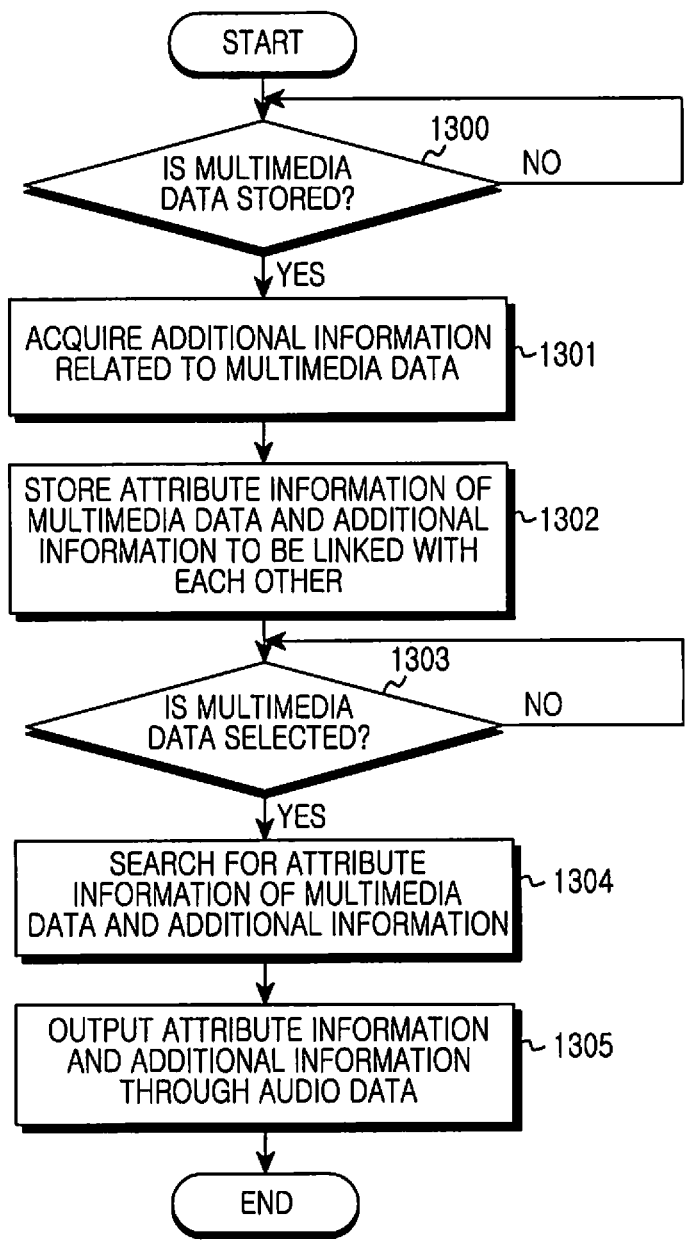
FIGS. 13A to 13D are flowcharts illustrating an operation of an example of a method of processing multimedia data by an electronic device according to various embodiments of the present invention.

Referring to FIG. 13A, when multimedia data is stored, the processor 120 may download multimedia data, for example, still images or dynamic images from the outside and store the download multimedia data or may photograph a subject through a camera and store the photographed subject as multimedia data in operation 1300.

The processor 120 may acquire various pieces of additional information related to the multimedia data in operation 1301, and store the acquired additional information to be linked with attribute information of the multimedia data in operation 1302.

For example, when it takes a long time to acquire the additional information, the processor 120 may first store the multimedia data and then, when additional information related to the stored multimedia data is acquired, store the attribute information of the multimedia data and the additional information to be linked with each other. Here, an operation of acquiring the additional information may be performed when the electronic device goes into an idle state.

In contrast, when it does not take a long time to acquire the additional information, the processor 120 may acquire the additional information and store attribute information of the multimedia data and the additional information to be linked with each other while storing the multimedia data.

When the multimedia data is selected in operation 1303, the processor 120 may search for the attribute information of the multimedia data and the stored additional information linked with the attribute information in operation 1304, and output the found attribute information and additional information through audio data in operation 1305.

That is, the processor 120 may reproduce and output one or more pieces of the attribute information of the multimedia data and the additional information together through audio data while selecting the multimedia data, so that the user can watch a reproduced image of the multimedia data and listen to various pieces of relevant information through audio data at the same time. Hereinafter, operation 1301 of acquiring additional information related to the multimedia data will be described in detail.

Figure 13B:
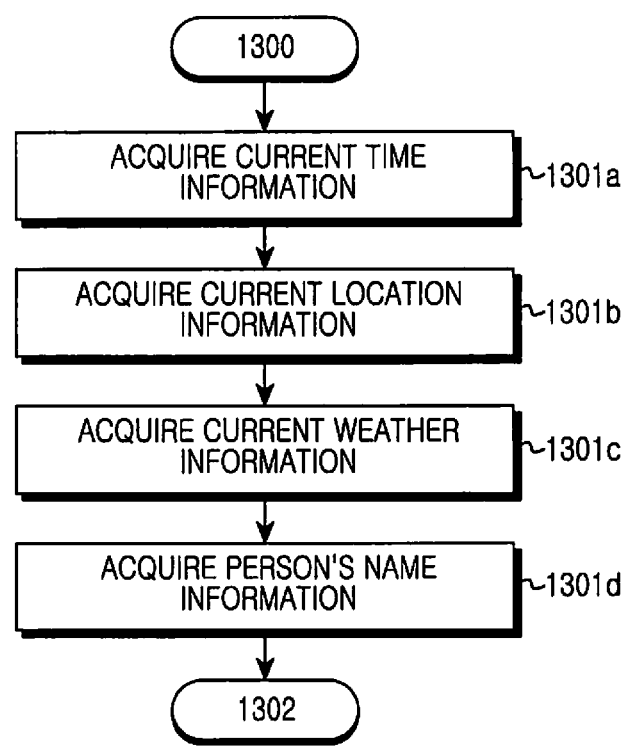

Referring to FIG. 13B, the processor 120 may acquire current time information displayed on the screen of the electronic device 101 in operation 1301a, acquire current location information of the electronic device 101 in operation 1301b, and current weather information in operation 1301c.

For example, the processor 120 may acquire the current location information of the electronic device 101 and the current weather information by using at least one of the GPS module, the Wi-Fi module, the BT module, and the cellular module included in the communication module 220 of FIG. 2.

The processor 120 may recognize a person's face included in the image of the multimedia data and may acquire a person's name information corresponding to the recognized face in operation 1301d. Hereinafter, operation 1301d of acquiring the person's name information will be described in detail.

Figure 13C:
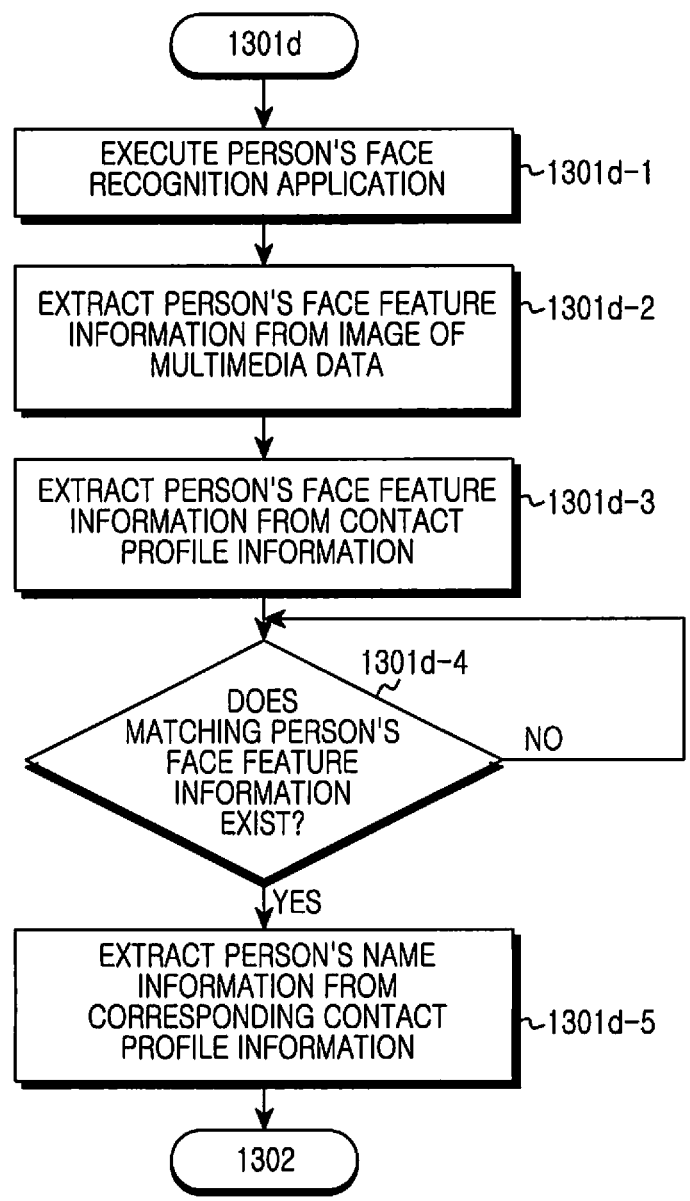

Referring to FIG. 13C, the processor 120 may execute an application for recognizing a person's face through an image scan operation in operation 1301d-1, and may extract a person's face feature information from the image of the multimedia data through the application in operation 1301d-2.

The processor 120 may extract the person's face feature information through the image scan operation for information already stored in the electronic device, for example, photos included in profile information of contacts in operation 1301d-3.

The processor 120 may compare the extracted person's face feature information in operation 1301d-4. When there is matching or similar person's face feature information, the processor 120 may extract a name of the matching or similar person from the profile information in operation 1301d-5. Hereinafter, operations after operation 1305 of outputting the attribute information and the additional information through the audio data will be described in detail.

Figure 13D:
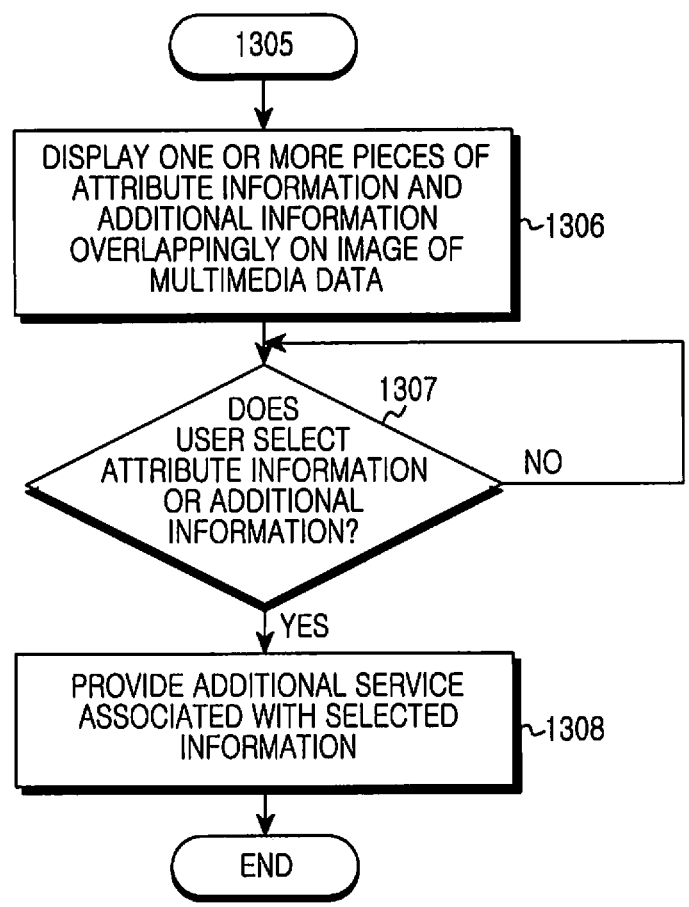

Referring to FIG. 13D, the processor 120 may generate one or more pieces of the attribute information and the additional information as sub screens and overlappingly display the sub screens on the image of the multimedia data in operation 1306.

When the user selects the overlappingly displayed attribute information or additional information in operation 1307, the processor 120 may provide an additional service linked to the selected information in operation 1308.

For example, when the user selects date information from the overlappingly displayed information, the processor 120 may provide a schedule management service to the user by displaying a schedule planner including the date. When the user selects name information, the processor 120 may provide a profile search service to the user by displaying profile information including the name.

Figure 14:
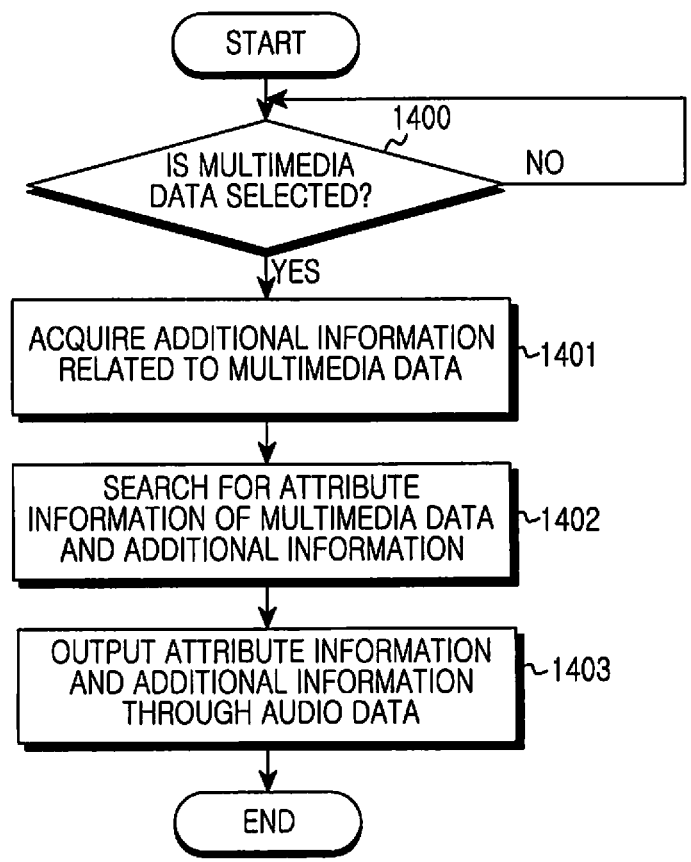
FIG. 14 is a flowchart illustrating an operation of another example of a method of processing multimedia data by an electronic device according to various embodiments of the present invention.

FIG. 14 is a flowchart illustrating an operation of another example of a method of processing multimedia data by an electronic device according to various embodiments of the present invention. Referring to FIG. 14, when multimedia data is selected in operation 1400, the processor 120 may download multimedia data, for example, still images or dynamic images from the outside and reproduce the downloaded multimedia data, or may photograph a subject through a camera and select the multimedia data.

The processor 120 may acquire various pieces of additional information related to the multimedia data in operation 1401. For example, the processor 120 may acquire current location information of the electronic device 101 and current weather information based on at least one of the GPS module, the Wi-Fi module, the BT module, and the cellular module included in the communication module 220 of FIG. 2.

The processor 120 may recognize a person's face included in the image of the multimedia data and acquire a person's name information corresponding to the recognized face. The processor 120 may search for the acquired additional information, and attribute information and additional information in the multimedia data file in operation 1402, and output the attribute information and the additional information through audio data in operation 1403.

That is, the processor 120 may reproduce and output one or more pieces of the attribute information of the multimedia data and the additional information together through audio data while selecting the multimedia data, so that the user can watch a reproduced image of the multimedia data and listen to various pieces of relevant information through audio data at the same time.

The methods as described in the claims or specification according to various embodiments of the present invention may be implemented by hardware, software, or a combination of hardware and software. In the implementation of software, a computer-readable storage medium for storing one or more programs (software modules) may be provided. The one or more programs stored in the computer-readable storage medium may be configured for execution by one or more processors 120 within the electronic device. The at least one program may include instructions that cause the electronic device to perform the methods according to various embodiments of the present invention as defined by the appended claims and/or disclosed herein.

The programs (software modules or software) may be stored in non-volatile memories including a random access memory and a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In various specific embodiments of the present invention as described above, an element or elements included in the present invention are expressed in a singular form or plural form according to the presented specific embodiments. However, the singular form or plural form is selected for convenience of description suitable for the presented situation, and various embodiments of the present invention are not limited to a single element or multiple elements thereof. Further, either multiple elements expressed in the description may be configured into a single element or a single element in the description may be configured into multiple elements.

Meanwhile, while the invention has been shown and described with reference to specific embodiments thereof in the detailed description of the present invention, it goes without saying that various changes in form and details may be made therein without departing from the spirit and scope of the invention. Therefore, the scope of the present invention should not be defined as being limited to the embodiments, but should be defined by the appended claims and equivalents thereof.

The invention claimed is:

1. A method of processing multimedia data by an electronic device including a processor, the method comprising:
when the multimedia data, which includes an image including a plurality of faces, is stored, acquiring, by the processor, information related to the multimedia data in the electronic device, the acquired information including information related to the image by executing a face recognition application to extract facial features of each of the plurality of faces;
for each of the plurality of faces, comparing, by the processor, the extracted facial features with facial features extracted from profile information associated with contact information stored in the electronic device;
in the event that the comparing reveals a match, identifying, by the processor, based on the profile information, a name of a person whose extracted facial features match the extracted facial features of the face of the plurality of faces in the image;
ordering, by the processor, the names of the people whose extracted facial features match the extracted facial features of the respective faces of the plurality of faces in the image according to a predetermined order;
storing, by the processor, the acquired information including the identified names and the multimedia data in connection with each other in the electronic device; and
when the multimedia data is selected by a user input, outputting, by the processor, the multimedia data on a display of the electronic device and the stored information related to the multimedia data through audio data, and overlappingly displaying, by the processor, the stored information on the multimedia data, the identified names included in the stored information being output in the predetermined order.

2. The method of claim 1, wherein the information related to the multimedia data further includes at least one of a file type, weather, a category, and a brightness.

3. The method of claim 1, wherein the stored information is output through at least one of audio data of which orders are changed according to a context-specific priority and audio data of a sentence formed through a combination or a connection of a plurality of elements.

4. The method of claim 1, further comprising, when the information overlappingly displayed on the multimedia data is selected, providing an additional service related to the selected information.

5. A method of processing multimedia data by an electronic device including a processor, the method comprising:
when the multimedia data, which includes an image including a plurality of faces, is selected by a user input, acquiring, by the processor, information related to the multimedia data in the electronic device, the acquired information including information related to the image by executing a face recognition application to extract facial features of each of the plurality of faces;
outputting, by the processor, the multimedia data on a display of the electronic device; and
outputting, by the processor, the acquired information related to the multimedia data through audio data, and overlappingly displaying, by the processor, the stored information on the multimedia data,
wherein the information related to the image include names of people whose extracted facial features match facial features extracted from profile information associated with contact information stored in the electronic device, the names being identified by the processor based on the profile information and being ordered by the processor according to a predetermined order, and wherein, when the acquired information is output through the audio data, the identified names included in the acquired information are output in the predetermined order.

6. The method of claim 5, wherein the information related to the multimedia data further includes at least one of a file type, weather, a category and a brightness.

7. The method of claim 6, wherein the stored information is output through at least one of audio data of which orders are changed according to a context-specific priority or audio data of a sentence formed through a combination or a connection of a plurality of elements.

8. The method of claim 5, further comprising, when the information overlappingly displayed on the multimedia data is selected, providing an additional service related to the selected information.

9. An electronic device comprising:
an input device configured to receive a user input;
a memory configured to store multimedia data, which includes an image including a plurality of faces; and
a processor configured to control the memory,
wherein the processor further configured to:
acquire information related to multimedia data when the multimedia data is stored, the acquired information including information related to the image by executing a face recognition application to extract facial features of each of the plurality of faces,
for each of the plurality of faces. compare the extracted facial features with facial features extracted from profile information associated with contact information stored in the electronic device,
in the event that the comparison reveals a match, identify, based on the profile information, a name of a person whose extracted facial features match the extracted facial features of the face of the plurality of faces in the image,
order the names of the people whose extracted facial features match the extracted facial features of the respective faces of the plurality of faces in the image according to a predetermined order,
store the acquired information including the identified names and the multimedia data in connection with each other in the memory, and
when the multimedia data is selected by the user input, output the multimedia data on a display of the electronic device and the stored information related to the multimedia data through audio data, and overlappingly display the stored information on the multimedia data, the identified names included in the stored information being output in the predetermined order.

10. The electronic device of claim 9, wherein the information related to the multimedia data further includes at least one of a file type, weather, a category, and a brightness.

11. The electronic device of claim 9, wherein the stored information is output through at least one of audio data of which orders are changed according to a context-specific priority or audio data of a sentence formed through a combination or a connection of a plurality of elements.

12. The electronic device of claim 9, wherein, when the information overlappingly displayed on the multimedia data is selected, the processor further configured to provide an additional service related to the selected information.

* * * * *